United States Patent
Lee et al.

(10) Patent No.: US 11,800,550 B2
(45) Date of Patent: Oct. 24, 2023

(54) OPERATION METHOD OF TERMINAL AND BASE STATION IN WIRELESS COMMUNICATION SYSTEM, AND DEVICE SUPPORTING SAME

(71) Applicant: LG ELECTRONICS INC., Seoul (KR)

(72) Inventors: Kilbom Lee, Seoul (KR); Jiwon Kang, Seoul (KR); Jonghyun Park, Seoul (KR); Kyuseok Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 17/290,599

(22) PCT Filed: Nov. 1, 2019

(86) PCT No.: PCT/KR2019/014690
§ 371 (c)(1),
(2) Date: Apr. 30, 2021

(87) PCT Pub. No.: WO2020/091496
PCT Pub. Date: May 7, 2020

(65) Prior Publication Data
US 2021/0400677 A1    Dec. 23, 2021

(30) Foreign Application Priority Data
Nov. 2, 2018  (KR) .................. 10-2018-0133929

(51) Int. Cl.
*H04W 72/044*    (2023.01)
*H04W 72/541*    (2023.01)
(Continued)

(52) U.S. Cl.
CPC ........ *H04W 72/541* (2023.01); *H04B 17/336* (2015.01); *H04L 5/0051* (2013.01);
(Continued)

(58) Field of Classification Search
CPC . H04W 72/541; H04W 24/10; H04W 72/046; H04B 17/336; H04L 5/0051
See application file for complete search history.

(56) References Cited

U.S. PATENT DOCUMENTS

2017/0063503 A1    3/2017 Liu et al.
2019/0356364 A1*   11/2019 Maamari ............... H04L 5/0051
(Continued)

FOREIGN PATENT DOCUMENTS

| WO | 2016204549 | 12/2016 |
| WO | 2018199681 | 11/2018 |
| WO | WO-2022083606 A1 * | 4/2022 |

OTHER PUBLICATIONS

PCT International Application No. PCT/KR2019/014690, International Search Report dated Feb. 27, 2020, 17 pages.
(Continued)

*Primary Examiner* — Deepa Belur
(74) *Attorney, Agent, or Firm* — LEE HONG DEGERMAN KANG WAIMEY

(57) ABSTRACT

The present disclosure provides an operation method of a terminal and a base station in a wireless communication system, and a device supporting same. According to an embodiment applicable to the present disclosure, on the basis of an assumption that two or more channel measurement resource (CMR) configurations having the same quasi co located (QCL) source in terms of a related spatial parameter from among a plurality of CMR configurations configured for the terminal share the same interference measurement resource (IMR) configuration, the terminal may calculate a signal to interference noise ratio (SINR) and report the calculated SINR to the base station.

15 Claims, 23 Drawing Sheets

(51) Int. Cl.
*H04B 17/336* (2015.01)
*H04L 5/00* (2006.01)
*H04W 24/10* (2009.01)
*H04W 56/00* (2009.01)

(52) U.S. Cl.
CPC ......... *H04W 24/10* (2013.01); *H04W 56/001* (2013.01); *H04W 72/046* (2013.01)

(56) References Cited

U.S. PATENT DOCUMENTS

| | | | |
|---|---|---|---|
| 2020/0235832 A1* | 7/2020 | Lee | H04L 27/2613 |
| 2021/0211176 A1* | 7/2021 | Gao | H04B 7/0632 |
| 2021/0400677 A1* | 12/2021 | Lee | H04L 5/005 |
| 2022/0338023 A1* | 10/2022 | Cao | H04W 24/10 |
| 2022/0361195 A1* | 11/2022 | Sun | H04B 7/022 |

OTHER PUBLICATIONS

Huawei et al., "Beam measurement and reporting using L1-RSRQ and SINR," 3GPP TSG RAN WG1 Meeting #94, R1-1809123, Aug. 2018, 3 pages.
3rd Generation Partnership Project (3GPP), "Technical Specification Group Radio Access Network; NR; Physical layer procedures for data (Release 15)," 3GPP TS 38.214 V15.3.0, Sep. 2018, 96 pages.

\* cited by examiner

OPERATION METHOD OF TERMINAL AND BASE STATION IN WIRELESS COMMUNICATION SYSTEM, AND DEVICE SUPPORTING SAME

CROSS-REFERENCE TO RELATED APPLICATIONS

This application is the National Stage filing under 35 U.S.C. 371 of International Application No. PCT/KR2019/014690, filed on Nov. 1, 2019, which claims the benefit of earlier filing date and right of priority to Korean Application No. 10-2018-0133929, filed on Nov. 2, 2018, the contents of which are all hereby incorporated by reference herein in their entirety.

TECHNICAL FIELD

The following description relates to a wireless communication system, and more particularly, to a method of operating a terminal and a base station related to an operation of reporting a signal to interference noise ratio (SINR) related to a specific reference signal (e.g., the channel state information-reference signal (CSI-RS)) in a wireless communication system, and a device supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, the new generation RAT considering eMBB communication, massive MTC, ultra-reliable and low-latency communication (URLLC), etc. has been introduced.

DISCLOSURE

Technical Problem

An object of the present disclosure is to provide a method of operating a terminal and a base station in a wireless communication system, and devices supporting the same.

The technical objects that can be achieved through the present disclosure are not limited to what has been particularly described hereinabove and other technical objects not described herein will be more clearly understood by persons skilled in the art from the following detailed description.

Technical Solution

The present disclosure provides a method of operating a terminal and a base station in a wireless communication system, and devices supporting the same.

As an example of the present disclosure, a method of operating a user equipment (UE) in a wireless communication system includes receiving, from a base station, a plurality of channel measurement resource (CMR) configurations for reporting of a signal to interference noise ratio (SINR) and one or more interference measurement resource (IMR) configurations; based on an assumption that two or more CMR configurations having the same Quasi Co Located (QCL) source in terms of a related spatial parameter among the plurality of CMR configurations share the same IMR configuration, calculating an SINR related to the plurality of CMR configurations; and reporting the SINR related to the plurality of CMR configurations to the base station.

In the present disclosure, the CMR configurations and the one or more IMR configurations may be received through higher layer signaling.

In the present disclosure, one CMR configuration may include a non-zero power channel state information-reference signal (NZP CSI-RS) resource, or a synchronization signal/physical broadcast channel (SS/PBCH) block resource, wherein one IMR configuration may include a channel state information-interference measurement (CSI-IM) resource or a non-zero power channel state information-reference signal (NZP CSI-RS) resource.

In the present disclosure, based on at least two CMR configurations having the same QCL source in terms of a related spatial parameter among the plurality of CMR configurations, the number of the one or more IMR configurations may be configured to be smaller than the number of the plurality of CMR configurations.

In the present disclosure, the plurality of CMR configurations and the one or more IMR configurations may be related by resource-wise.

In the present disclosure, the QCL source in terms of the related spatial parameter may be determined based on a spatial reception parameter (spatial Rx parameter).

In the present disclosure, the QCL source in terms of the related spatial parameter may include channel state information-reference signal (CSI-RS) resource information, synchronization signal/physical broadcast channel (SS/PBCH) block information, or tracking reference signal (TRS) information.

In the present disclosure, the QCL source in terms of the related spatial parameter may include at least one of the followings:

(i) a first QCL source configured for one CMR configuration; or (ii) a second QCL source having a QCL linkage with the first QCL source configured for the one CMR configuration.

In the present disclosure, an SINR related to one CMR configuration among the plurality of CMR configurations may be calculated based on (i) a reference signal received power (RSRP) measured based on the one CMR configuration, and (ii) an interference power measured based on an IMR configuration related to the one CMR configuration.

In the present disclosure, based on a determination that (i) one CMR configuration among the plurality of CMR configurations and (ii) one IMR configuration among the one or more EIR configurations are configured to overlap on a time resource, the UE may assume that the one CMR configuration and the one IMR configuration have the QCL source in terms of the same spatial parameter.

In the present disclosure, the SINR may include an L1-SINR defined as physical layer information.

In the present disclosure, the UE may correspond to at least one of the followings:

(i) a first UE reporting UE capability information indicating that the number of simultaneously definable reception beams is 1 to the base station; or (ii) a second UE having the number of simultaneously definable reception beams configured with 1 by the base station.

As another example of the present disclosure, a terminal operating in a wireless communication system includes at least one transmitter; at least one receiver; at least one processor; and at least one memory operably connected to the at least one processor and configured to store instructions causing, when executed, the at least one processor to perform a specific operation, wherein the specific operation includes: receiving, from a base station, a plurality of channel measurement resource (CMR) configurations for reporting of a signal to interference noise ratio (SINR) and one or more interference measurement resource (IMR) configurations; based on an assumption that two or more CMR configurations having the same Quasi Co Located (QCL) source in terms of a related spatial parameter among the plurality of CMR configurations share same IMR configuration, calculating an SINR related to the plurality of CMR configurations; and reporting the SINR related to the plurality of CMR configurations to the base station.

In the present disclosure, the terminal may communicate with at least one of a mobile terminal, a network, and an autonomous vehicle other than a vehicle containing the terminal.

As another example of the present disclosure, a base station operating in a wireless communication system includes at least one transmitter; at least one receiver; at least one processor; and at least one memory operably connected to the at least one processor and configured to store instructions causing, when executed, the at least one processor to perform a specific operation, wherein the specific operation includes: transmitting, to the terminal, a plurality of channel measurement resource (CMR) configurations for reporting of a signal to interference noise ratio (SINR) and one or more interference measurement resource (IMR) configurations; and receiving an SINR related to the plurality of CMR configurations from the terminal, wherein two or more CMR configurations having the same Quasi Co Located (QCL) source in terms of a related spatial parameter among the plurality of CMR configurations are configured to share the same IMR configuration.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

As is apparent from the above description, the embodiments of the present disclosure have the following effects.

According to the present disclosure, signaling overhead produced when a base station provides CMR configuration information and IMR configuration information to a terminal may be reduced.

In addition, according to the present disclosure, the base station may establish, in the same time interval, the CMR configuration and the IMR configuration with a QCL source from the perspective of the same spatial parameter. Accordingly, the terminal and the base station may minimize the latency of SINR reporting.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
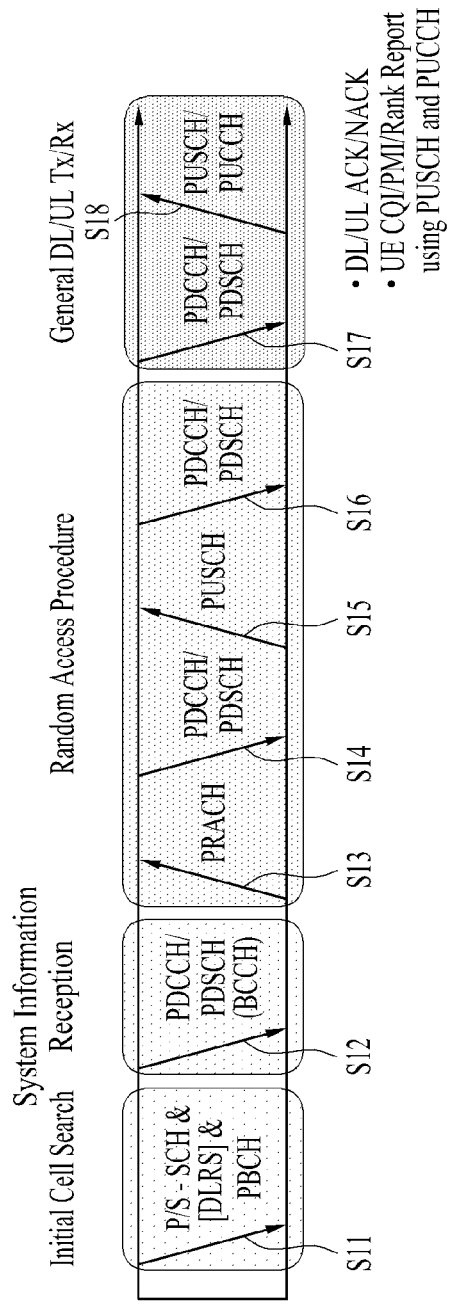
FIG. 1 is a diagram illustrating physical channels and a general signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 2:
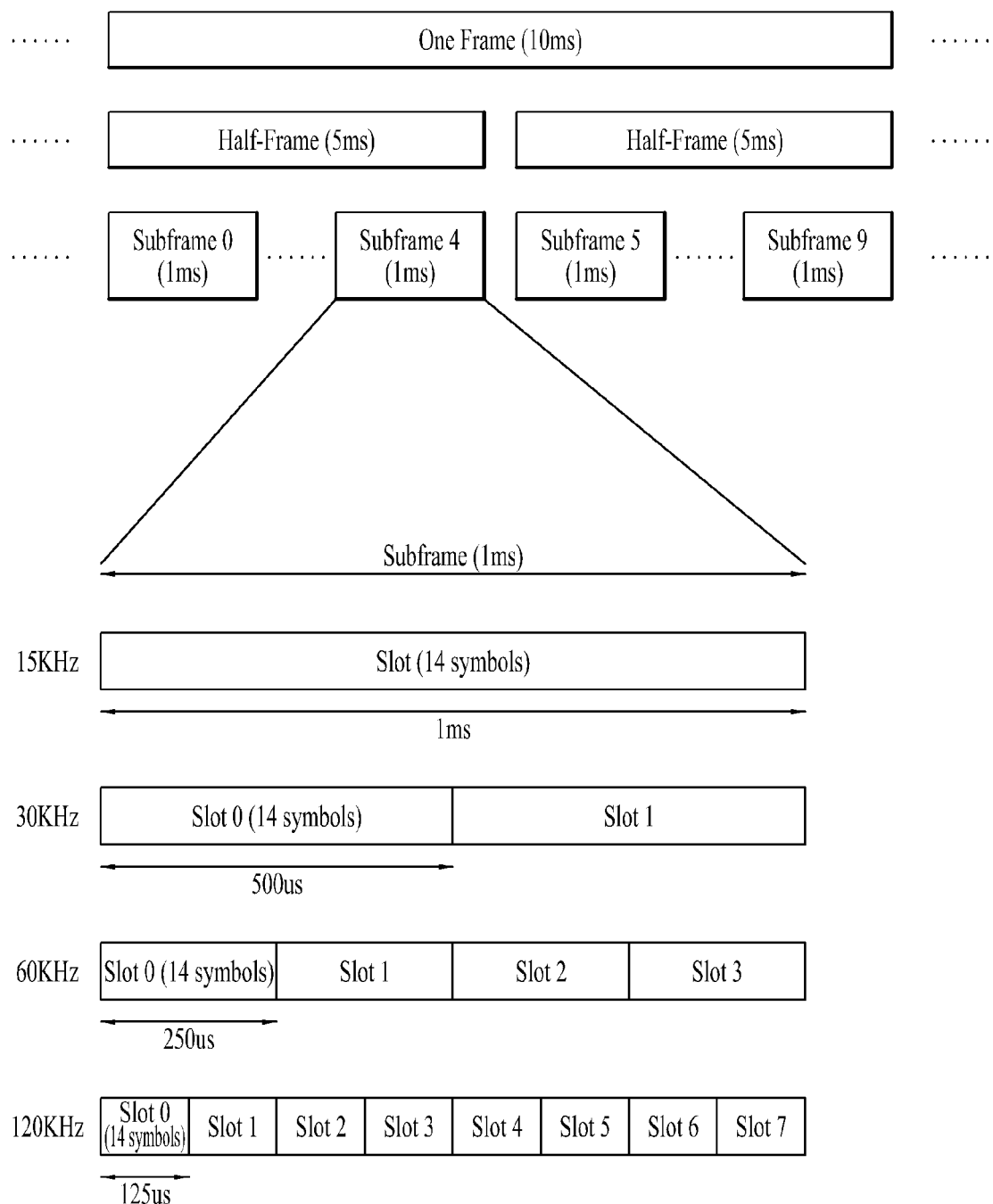
FIG. 2 is a diagram illustrating a radio frame structure in an NR system to which embodiments of the present disclosure are applicable.

FIG. 2 is a diagram illustrating a radio frame structure in an NR system to which embodiments of the present disclosure are applicable.

In the NR system, UL and DL transmissions are based on a frame as illustrated in FIG. 2. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N_{slot}^{symb}$ represents the number of symbols in a slot, $N_{frame,\mu}^{slot}$ represents the number of slots in a frame, and $N_{subframe,\mu}^{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

NR supports multiple numerologies (or subcarrier spacings (SCSs)) to support various 5G services. For example, when the SCS is 15 kHz, a wide area is supported in traditional cellular bands. When the SCS is 30 kHz/60 kHz, a dense-urban area, lower latency, and a wider carrier bandwidth are supported. When the SCS is 60 kHz or higher, a bandwidth greater than 24.25 GHz is supported to overcome phase noise.

The NR frequency band is defined as the frequency range of two types FR1 and FR2. FR1 and FR2 may be configured as shown in the table below. Further, FR2 may mean a millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 3:
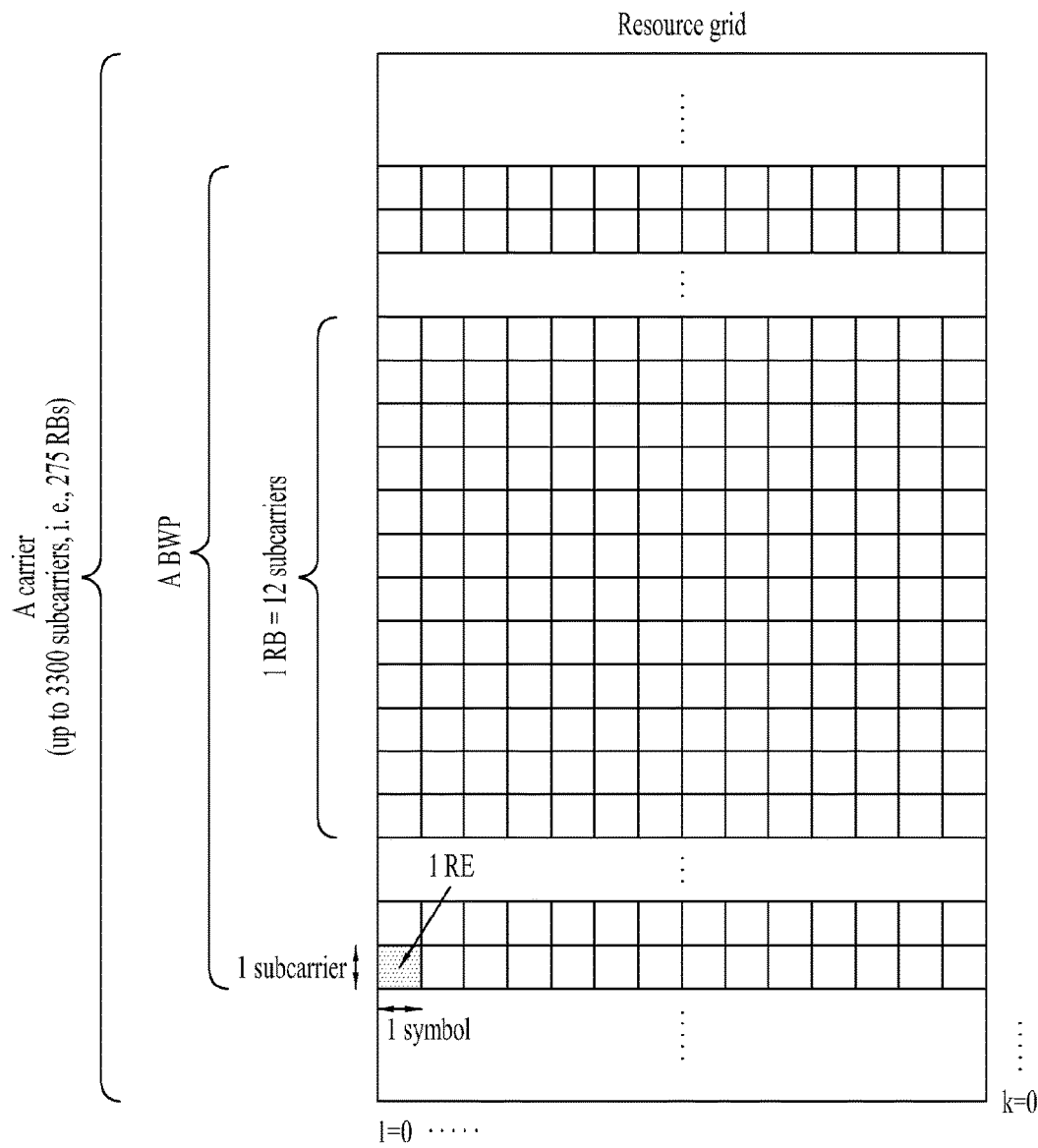
FIG. 3 is a diagram illustrating a slot structure in an NR system to which embodiments of the present disclosure are applicable.

FIG. 3 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
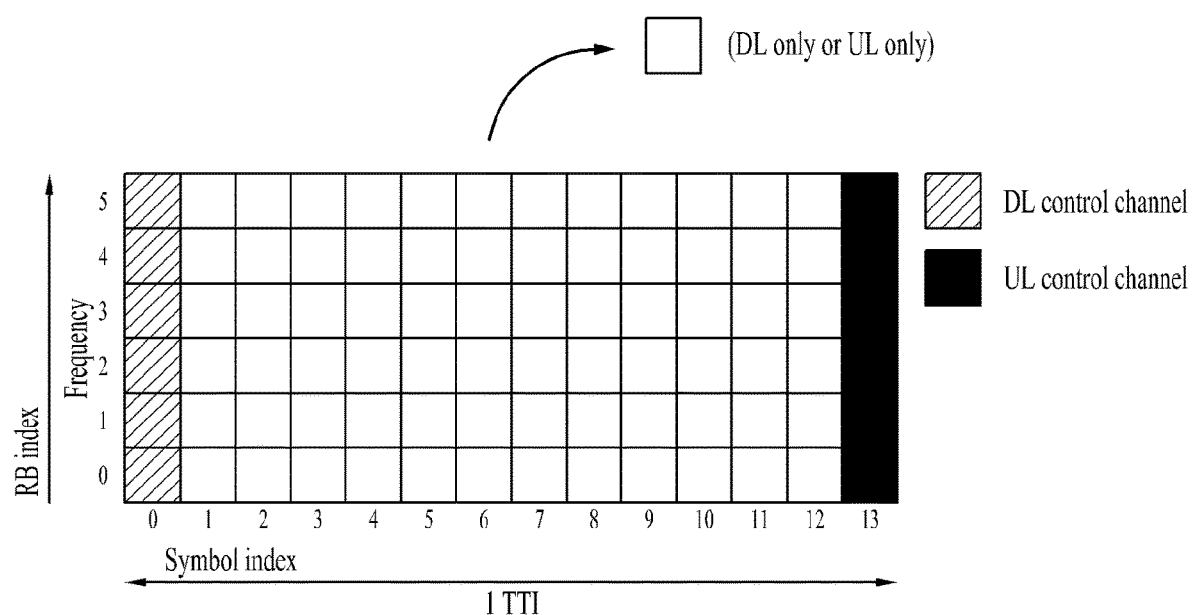
FIG. 4 is a diagram illustrating a self-contained slot structure in an NR system to which embodiments of the present disclosure are applicable.

FIG. 4 is a diagram illustrating a self-contained slot structures in an NR system to which embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Figure 5:
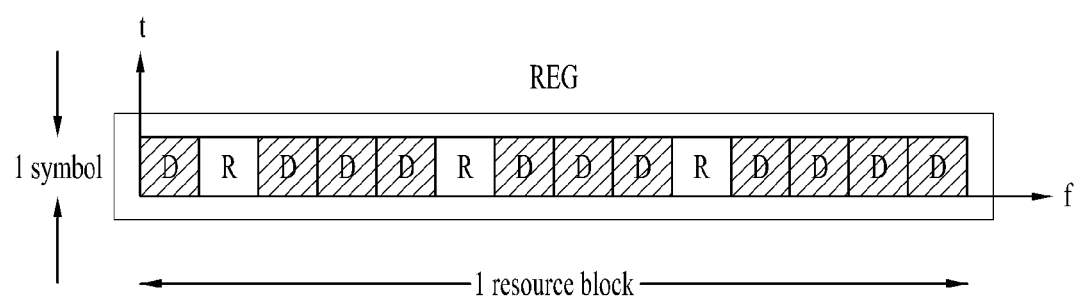
FIG. 5 is a diagram illustrating the structure of one REG in an NR system to which embodiments of the present disclosure are applicable.

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 5.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

FIG. 5 is a diagram illustrating the structure of one REG in an NR system to which embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 4

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 22 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include an MCS/NDI (New Data Indicator)/RV (Redundancy Version) field for transport block (TB) 1, and may further include an MCS/NDI/RV field for TB 2 only when a higher layer parameter maxNrofCodeWordsScheduledByDCI in the higher layer parameter PDSCH-Config is configured with n2 (i.e., 2).

In particular, when the higher layer parameter maxNrofCodeWordsScheduledByDCI is configured with n2 (i.e., 2), whether the TB is enabled/disabled may substantially be determined by a combination of the MCS field and the RV field. More specifically, when the MCS field has a value of 26 and the RV field has a value of 1 for a specific TB, the specific TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.4. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.5. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe,\mu}_{slot}$+1). Here, $N^{subframe,\mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDci is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold timeDurationForQCL.

For both the cases when higher layer parameter tci-PresentInDCI is configured with 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
- 'QCL-TypeC' with an SS/PBCH block and, when (QCL-TypeD) is applicable, 'QCL-TypeD' with the same SS/PBCH block; or
- 'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with higher layer parameter repetition.

For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource; or
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH; or
- 'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with a periodic CSI-RS resource in the higher layer parameter NZP-CSI-RS-ResourceSet configured with the higher layer parameter repetition; or
- 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource; or
- 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition; or 'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource; or 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition; or 'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource; or 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition; or QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

In this document, QCL signaling may include all signaling configurations listed in the table below.

TABLE 5

| QCL linkage for FR2 after RRC | signalling |
|---|---|
| SSB → TRS w.r.t average delay, Doppler shift, spatial RX parameters | QCL type: C + D |

TABLE 5-continued

| QCL linkage for FR2 after RRC | signalling |
|---|---|
| TRS → CSI-RS for BM w.r.t average delay, Doppler shift, delay spread, Doppler spread estimation | QCL type: A + D |
| TRS → CSI-RS for CSI w.r.t. average delay, Doppler shift, delay spread, Doppler spread estimation | QCL type: A |
| TRS → DMRS for PDCCH w.r.t. average delay, Doppler shift, delay spread, Doppler spread estimation | QCL type: A + D |
| TRS → DMRS for PDSCH w.r.t. average delay, Doppler shift, delay spread, Doppler spread estimation | QCL type: A + D |
| SSB → CSI-RS for BM w.r.t. average delay, Doppler shift, spatial RX parameters | QCL type: C + D |
| SSB → CSI-RS for CSI w.r.t, spatial RX parameters | QCL type: D |
| SSB → DMRS for PDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t. average delay, Doppler shift, delay spread, Doppler spread, spatial RX parameters | QCL type: A + D |
| CSI-RS for BM → DMRS for PDCCH w.r.t. spatial RX parameters | QCL type: D |
| CSI-RS for BM → DMRS for PDSCH w.r.t., spatial RX parameters | QCL type: D |
| CSI-RS for CSI → DMRS for PDSCH w.r.t. average delay, Doppler shift, delay spread, Doppler spread, spatial RX parameters; Note: QCL parameters may not be derived directly from CSI-RS for CSI | QCL type: A + D |
| CSI-RS for BM → CSI-RS for TRS/BM/CSI w.r.t. spatial RX parameters | QCL type: D |

In the following tables, if one row in the tables below has the same RS type, the same RS ID may be assumed for the row.

In the present disclosure, when a CSI-RS resource is included in the higher layer parameter NZP-CSI-RS-ResourceSet in which the higher layer parameter trs-Info is configured, the UE may expect the following two possible configurations for a higher layer parameter TCI-state.

TABLE 6

| Valid TCI state Configuration | DL RS 1 | qcl-Type1 | DL RS 2 (if configured) | qd-Type2 (if configured) |
|---|---|---|---|---|
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In Table 6, * represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter trs-Info and the higher layer parameter repetition are not configured, the UE expects the following three possible configurations for the higher layer parameter TCI-state.

TABLE 7

| Valid TCI state Configuration | DL RS 1 | qcl-Type1 | DL RS 2 (if configured) | qcl-Type2 (if configured) |
|---|---|---|---|---|
| 1** | TRS | QCL-TypeA | TRS | QCL-TypeD |
| 2** | TRS | QCL-TypeA | SS/PBCH Block | QCL-TypeD |
| 3** | TRS | QCL-TypeA | CSI-RS (BM) | QCL-TypeD |
| 4* | TRS | QCL-TypeB | | |

In Table 7, * represents a case in which QCL type-D is not applicable.

In Table 7, ** represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter repetition is configured, the UE expects the following three possible configurations for the higher layer parameter TCI-state.

TABLE 8

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

In Tables 9 and 10 below, if QCL type-D is applicable DL RS 2 and QLC type-2 need to be configured for the UE except a default case (e.g., the fourth row in Tables 9 and 10). When a TRS for DL is used for QCL type-D, the TRS is a source RS for QCL type-D and thus needs to have an SS/PBCH block or CSI-RS.

For a PDCCH DMRS, the UE expects the following three possible configurations for the higher layer parameter TCI-state. The fourth configuration is a default configuration and valid before the TRS is configured.

TABLE 9

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 9, * represents that the TRS is not configured yet. In this case, the configuration may be a valid QCL assumption rather than a TCI state.

In Table 9, ** represents that QCL parameters may not be directly derived from CSI-RS(s) (CSI).

For the DMRS of the PDCCH, the UE may expect only the following three possible configurations of the higher layer parameter TCI-State while the fourth configuration (the fourth row in the two tables below) is valid by default before the TRS is configured.

TABLE 10

| Valid TCI state Configuration | DL RS 1 | qcl-Type1 | DL RS 2 (if configured) | qd-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 10, * represents that the TRS is not configured yet. In this case, the configuration may correspond to a valid QCL assumption rather than a TCI state.

In Table 10, ** represents that QCL parameters may not be directly derived from CSI-RS(s) (CSI).

For the DMRS of the PDCCH, the UE may expect only the following three possible configurations of the higher layer parameter TCI-State while the fourth configuration (the fourth row in the two tables below) is valid by default before the TRS is configured.

TABLE 11

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In the table above, * represents that the TRS is not configured yet. In this case, the configuration may correspond to a valid QCL assumption rather than a TCI state.

In the table above, ** represents that QCL parameters may not be directly derived from CSI-RS(s) (CSI).

1.6. Channel State Information Reference Signal (CSI-RS)

In a mobile communication system according to the present disclosure, a method of improving transmit/receive data efficiency by adopting multiple transmit antennas and multiple receive antennas is used for packet transmission. In transmitting and receiving data using multiple input/output antennas, a channel state between a transmit antenna and a receive antenna should be detected in order to receive a signal accurately. Thus, each transmit antenna may have a separate reference signal. In this case, a reference signal for feedback of channel state information (CSI) may be defined as a CSI-RS.

The CSI-RS includes a Zero Power (ZP) CSI-RS and a Non-Zero-Power (NZP) CSI-RS. Here, the ZP CSI-RS and the NZP CSI-RS may be defined as follows.

The NZP CSI-RS may be configured by the CSI-RS-Resource-Mobility field in the NZP-CSI-RS-Resource Information Element (IE) or CSI-RS-ResourceConfig-Mobility IE. The NZP CSI-RS may be defined based on a sequence generation and resource mapping method defined in the 3GPP TS 38.211 standard specification.

The ZP CSI-RS may be configured by the ZP-CSI-RS-Resource IE. The UE may assume that resources configured for the ZP CSI-RS are not used for PDSCH transmission. The UE may perform the same measurement/reception on channels/signals except PDSCH regardless of whether they collide with ZP CSI-RS or not.

The position to which the CSI-RS is mapped in one slot may be dynamically determined by the number of CSI-RS ports, the CSI-RS density, Code Division Multiplexing (CDM)-Type, and higher layer parameters (e.g., firstOFDM-SymbolInTimeDomain, firstOFDMSymbolInTimeDomain2, etc.).

1.7. Channel State Information Interference Measurement (CSI-IM)

For interference measurement, the BS may configure CSI-IM support for the UE. The measurement result on the corresponding CSI-IM resource may be regarded as interference in the CSI calculation.

For the UE, one or more CSI-IM resource set configuration(s) indicated by the higher layer parameter CSI-IM-ResourceSet may be configured. Here, each CSI-IM resource set may be composed of K (K≥1) CSI-IM resource(s).

For each CSI-IM resource configuration, the following parameters may be configured through the higher layer parameter CSI-IM-ResourceSet:

csi-IM-ResourceId: This parameter may determine the CSI-IM resource configuration ID.

subcarrierLocation-p0 or subcarrierLocation-p1: This parameter may determine the subcarrier occupancy of the CSI-IM resource in a slot in which csi-IM-ResourceElementPattern is set as 'pattern0' or 'pattern1'.

symbolLocation-p0 or symbolLocation-p1: This parameter may determine the OFDM symbol position of the CSI-IM resource in a slot in which csi-IM-ResourceElementPattern is set as 'pattern0' or 'pattern1'.

periodicityAndOffset: This parameter may determine the CSI-IM periodicity and slot offset for a periodic/semi-persistent CSI-IM.

freqBand: This parameter may include parameters for enabling the frequency occupancy configuration of CSI-IM.

1.8. Operation Example of Beam Management Procedure

In the present disclosure, the following DL L1/L2 beam management procedure may be supported within one or more Transmission and Reception Points (TRPs):

P1: P1 may be used in enabling UE measurement on different TRP Tx beams to support selection of TRP Tx beams and/or UE Rx beam(s).

>> For beamforming at a TRP, P1 may include intra/inter TRP Tx beam sweeping from a set of different beams.

>> For beamforming at a UE, P1 may include Rx beam sweeping of the UE from a set of different beams.

P2: P2 may be used in enabling measurement of a UE on different TRP Tx beams, to allow change of inter/intra TRP Tx beams.

>> P2 may be interpreted as a special case of P1. Thus, a set of beams for beam refinement may be configured to be smaller than P1.

P3: P3 may be used in enabling measurement of the UE on the same TRP Tx beam to allow change of the UE Rx beam when the UE uses beamforming.

In the present disclosure, the same procedure design may be applied for intra-TRP beam management and inter-TRP beam management. Accordingly, the UE may be designed to not know whether a beam is an intra-TRP beam or an inter-TRP beam.

The P2 and P3 procedures may be performed jointly and/or multiple times. Thereby, the TRP Tx beam and the UE Rx beam may be changed at the same time.

The P3 procedure may be performed without modifying the physical layer procedure defined in the existing standard specification (without specification impact). Alternatively, the P3 procedure may be performed through partial modification of the physical layer procedure defined in the existing standard specification.

The above-described methods may support management of a plurality of Tx/Rx beam pairs for a UE.

In addition, assistance information may be provided from another carrier for the methods described above.

The methods described above may be applied to all frequency bands in the same manner.

The methods described above may be used on a single beam/multiple beam per TRP.

In the present disclosure, the CSI-RS may support DL Tx beam sweeping and UE Rx beam sweeping. For example, the CSI-RS may be used for P1, P2, and P3 described above.

To this end, the CSI-RS may support the following mapping structure:
Np CSI-RS port(s) may be mapped in every (sub-)time unit
>> The same CSI-RS antenna port(s) may be mapped over (sub-)time units.
>> Np may be configured with various values. For example, it may be configured with a fixed value by a standard specification, or may be configured with one of a plurality of values through configuration of a BS (e.g., RRC signaling, DCI, etc.).
>> In the present disclosure, a "time unit" may refer to a period of N OFDM symbols on the configured (or reference) numerology. N may be configured with a value greater than or equal to 1. N may be configured with a fixed value by a standard specification, or may be configured with one of a plurality of values through configuration of the BS (e.g., RRC signaling, DCI, etc.). In this case, the OFDM symbols constituting one time unit may be configured consecutively or non-consecutively.
Each time unit may be divided into a plurality of sub-time units.
>> In the present disclosure, various division methods (e.g., Time Division Multiplexing (TDM), Interleaved Frequency Division Multiplexing (IFDM), etc.) may be applied. An OFDM symbol level may be divided into an OFDM symbol length that is the same as the reference OFDM symbol length or an OFDM symbol length that is shorter than the reference OFDM symbol length (e.g., a larger subcarrier spacing).
The mapping structure may be used to support multiple panels or multiple Tx panels.
Various options may be taken into consideration for a CSI-RS mapping method for Tx and Rx beam sweeping.
(1) Option 1
Tx beam(s) may be identically configured over sub-time units in each time unit.
Tx beam(s) may be configured differently over time units
(2) Option 2
Tx beam(s) may be configured differently over sub-time units in each time unit.
Tx beam(s) may be identically configured over time units (3) Option 3
In one time unit, the Tx beam(s) may be identically configured over the sub-time units
In other time units, the Tx beam(s) may be configured differently over the sub-time units
A combination of different time units may be determined based on the number and the periodicity.
In the options described above, an operation of performing only Tx sweeping or Rx sweeping may also be applied.

For the above-described P3 procedure, the followings may be additionally considered.

When the sub-time unit is less than or equal to one OFDM symbol length, the Tx beam(s) may be configured identically or differently over the sub-time units in each time unit.

As an example, one OFDM symbol period may be divided into a plurality of sub-time units for a P3 operation. Accordingly, UE Rx beam sweeping for the same TRP Tx beam may be allowed.

In addition, a P3 operation based on IFDMA or (relatively) large subcarrier spacing may also be considered. When a P3 operation based on IFDMA is considered, the followings may be considered.
How many comb values should be supported;
Whether to support a comb offset;
Whether the UE is capable of clearly distinguishing between the NZP CSI-RS REs and the ZP (Null) REs within the same OFDM symbol (to utilize Rx beam sweeping for P3)

For the last issue among the issues above, Multiple CSI-RS resources including (i) one resource configured based on NZP and a specific comb value/offset, and (ii) other resources configured based on an independent comb value/offset (to appropriately indicate null REs). In this case, whether CSI-RS resource multiplexing is appropriately supported for multiple UEs in the frequency domain may be further checked based on the appropriate null RE configuration and the independent comb value/offset configuration.

In summary, when IFDMA is considered, an appropriate null RE configuration may be considered in order to support CSI-RS resource multiplexing for multiple UEs in the frequency domain.

On the other hand, the P3 operation may be supported by (i) configuring a single CSI-RS resource including a plurality of OFDM symbols, or (ii) repeating the same CSI-RS resource over a plurality of OFDM symbols. According to this approach, a simpler UE implementation may be supported by maintaining the beam sweeping interval so as to be an integer multiple of a symbol length.

In the present disclosure, a higher layer parameter NZP-CSI-RS-ResourceSet may be configured for the UE for a repetitive operation for the P3 operation. The higher layer parameter may be defined based on 3GPP TS 38.331 as follows.

| NZP-CSI-RS-ResourceSet information element |
| --- |
| -- ASN1START<br>-- TAG-NZP-CSI-RS-RESOURCESET-START<br>NZP-CSI-RS-ResourceSet ::=    SEQUENCE {<br>   nzp-CSI-ResourceSetId           NZP-CSI-RS-ResourceSetId,<br>   nzp-CSI-RS-Resources             SEQUENCE (SIZE (1..maxNrofNZP-CSI-RS-ResourcesPerSet))<br>                                    OF NZP-CSI-RS-ResourceId,<br>   repetition                      ENUMERATED { on, off }           OPTIONAL,    -- Need S<br>   aperiodicTriggeringOffset       INTEGER(0..6)                    OPTIONAL,    -- Need S<br>   trs-Info                        ENUMERATED {true}                OPTIONAL,    -- Need R<br>   ...<br>}<br>-- TAG-NZP-CSI-RS-RESOURCESET-STOP<br>-- ASN1STOP |

In this case, the parameter repetition in the NZP-CSI-RS-ResourceSet IE may be defined as follows.

repetition in ZNP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Subclause 51.6.1.2, and can be configured only when the higher Inver parameter reportQuantity associated with all the reporting settings linked with the CSI-RS resource set is set to 'cri-RSRP' or 'none'.

1.9. CSI Reporting-Related Configurations

For CSI reporting applicable to the present disclosure, the following parameters may be configured for the UE.

(1) CSI-ReportConfig

The higher layer parameter may be defined based on 3GPP TS 38.331 as follows.

ciated with one or multiple CSI-ReportConfig where each CSI-ReportConfig linked to periodic, or semi-persistent, or aperiodic resource setting(s):

When one Resource Setting is configured, the Resource Setting (given by higher layer parameter resourcesForChannelMeasurement) is for channel measurement for L1-RSRP computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-ResourcesForInterference) is for interference measurement performed cm CSI-IM or on NZP CSI-RS.

When three Resource Settings are configured, the first Resource Setting (higher layer parameter resources-

| CSI-ReportConfig information element |
| --- |

```
-- ASN1START
-- TAG-CSI-REPORTCONFIG-START
CSI-ReportConfig ::=                    SEQUENCE {
    reportConfigId                          CSI-ReportConfigId,
    carrier                                 ServCellIndex              OPTIONAL,      -- Need S
    resourcesForChannelMeasurement          CSI-ResourceConfigId,
    csi-IM-ResourcesForInterference         CSI-ResourceConfigId       OPTIONAL,      -- Need R
    nzp-CSI-RS-ResourcesForInterference     CSI-ResourceConfigId       OPTIONAL,      -- Need R
    reportConfigType                        CHOICE {
        periodic                                SEQUENCE {
            reportSlotConfig                        CSI-ReportPeriodicityAndOffset,
            pucch-CSI-ResourceList                      SEQUENCE (SIZE (1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                      SEQUENCE (SIZE (1..maxNrofBWPs)) OF PUCCH-CSI-Resource
        },
        semiPersistentOnPUSCH                   SEQUENCE {
            reportSlotConfig                        ENUMERATED {sl5, sl10, sl20, sl40, sl80, sl160, sl320},
            reportSlotOffsetList                    SEQUENCE (SIZE (1.. maxNrofUL-Allocations)) OF INTEGER(0...32),
            p0alpha                                 P0-PUSCH-AlphaSetId
        },
        aperiodic                               SEQUENCE {
            reportSlotOffsetList                    SEQUENCE (SIZE (1..maxNrofUL-Allocations)) OF INTEGER(0...32)
        }
    },
    reportQuantity                          CHOICE {
        none                                    NULL,
        cri-RI-PMI-CQI                          NULL,
        cri-RI-i1                               NULL,
    cri-RI-i1-CQI                           SEQUENCE {
        pdsch-BundleSizeForCSI                  ENUMERATED {n2, n4}        OPTIONAL       -- Need S
    },
    cri-RI-CQI                              NULL,
    cri-RSRP                                NULL,
    ssb-Index-RSRP                          NULL,
    cri-RI-LI-PMI-CQI                       NULL,
},
...
groupBasedBeamReporting                 CHOICE {
    enabled                                 NULL,
    disabled                                SEQUENCE {
        nrofReportedRS                          ENUMERATED {n1, n2, n3, n4}    OPTIONAL  -- Need S
    }
},
```

Here, resourceForChannelMeasurement, csi-IM-ResourceForInterference, and nzp-CSI-RS-ResourceForInterference in the CSI-ReportConfig IE may have the following relationship.

For aperiodic CSI, each trigger state configured using the higher parameter CSI-AperiodicTriggerState is asso- ForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesForInterference) it for NZP CSI-RS based interference measurement.

For semi-persistent or periodic CSI, each CSI-ReportConfig is linked to periodic or semi-persistent Resource Settings(s):

When one Resource Setting (given by higher layer parameter resourcesForChannelMeasurement) is configured, the Resource Setting is for channel measurement for L1-RSRP computation.

When two Resource Settings are configured, the first Resource Setting (given by higher layer parameter resourcesForChannelMeasurement) is for channel measurement and the second Resource Setting (given by higher layer parameter csi-IM-ResourcesForInterference) is used for interference measurement performed on CSI-IM.

A UE is not expected to be configured with more than one CSI-RS resource in resource set for channel measurement for a CSI-ReportConfig with the higher layer parameter codebookType set to 'typeII' or to 'typeII-PortSelection'. A UE is not expected to be configured with more than 64 NZP CSI-RS resources in resource setting for channel measurement for a CSI-ReportConfig with the higher layer parameter reportQuantity set to 'none', 'cri-RI-CQI', 'cri-RSRP' or 'ssb-Index-RSRP'. If interference measurement is performed on CSI-IM, each CSI-RS resource for channel measurement is resource-wise associated with a CSI-IM resource by the ordering of the CSI-RS resource and CSI-IM resource in the corresponding resource sets. The number of CSI-RS resources for channel measurement equals to the number of CSI-IM resources.

If interference measurement is performed on NZP CSI-RS, a UE does not expect to be configured with more than one NZP CSI-RS resource in the associated resource set within the resource setting for channel measurement. The UE configured with the higher layer parameter nzp-CSI-RS-ResourcesForInterference may expect no more than 18 NZP CSI-RS ports configured in a NZP CSI-RS resource set.

For CSI measurement(s), a UE assumes:
each NZP CSI-RS port configured for interference measurement corresponds to an interference transmission layer.
all interference transmission layers on NZP CSI-RS ports for interference measurement take into account the associated EPRE ratios configured in 5.2.2.3.1;
other interference signal on REs of NZP CSI-RS resource for channel measurement. NZP CSI-RS resource for interference measurement, or CSI-IM resource for interference measurement.

Based on the relationship above, CSI calculation may be performed as follows.

If the UE is configured with a CSI-ReportConfig with the higher layer parameter reportQuantity set to 'cri-RSRP', 'cri-RI-PMI-CQI'. 'cri-RI-II'. 'cri-RI-II-CQI', 'cri-RI-CQI' or 'cri-RI-LI-PMI-CQI', and $K_s>1$ resources are configured in the corresponding resource set for channel measurement, then the UE shall derive the CSI parameters other than CRI conditioned on the repotted CRI, where CRI k (k≥0) corresponds to the configured (k+1)-th entry of associated nzp-CSI-RSResource in the corresponding nzp-CSI-RS-ResourceSet for channel measurement, and (k+1)-th entry of associated csi-IM-Resource in the corresponding csi-IM-ResourceSet (if configured) If $K_s=2$ CSI-RS resources are configured, each resource shall contain at most 16 CSI-RS port. If $2<K_s\leq 8$ CSI-RS resources are configured, each resource si tall contain at most 8 CSI-RS ports.

A report on reportQuantity={cri-RSRP or ssb-Index-RSRP} may be distinguished based on whether the parameter groupBasedBeamReporting in the CSI-ReportConfig IE is 'enabled' or 'disabled' as follows.

If the UE is configured with a CSI-ReportConfig with the higher layer parameter reportQuantity set to 'cri-RSRP' or 'ssb-Index-RSRP'.
if the UE is configured with the higher layer parameter groupBasedBeamReporting set to 'disabled', the UE is not required to update measurements for more than 64 CSI-RS and or SSB resources, and the UE shall report in a single report nrofReportedRS (higher layer configured) different CRI or SSBRI for each report setting.
if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and or SSB resources can be received simultaneously by the UE either with a single spatial domain receive filter, or with multiple simultaneous spatial domain receive filters.

If the UE is configured with a CSI-ReportConfig with higher layer parameter reportQuantity set to 'cri-RSRP' or 'none' and the CSI-ReportConfig is linked to a resource setting configured with the higher layer parameter resourceType set to 'aperiodic', then the UE is not expected to be configured with more than 16 CSI-RS resources in a CSI-RS resource set contained within the resource setting.

For L1-RSRP (Reference Signal Received Power) calculation, the UE may be configured as follows. In this case, the UE may perform the following reporting based on nrofReportedRS or groupBasedBeamReporting.

For L1-RSRP computation
the UE may be configured with CSI-RS resources. SS/PBCH Block resources or both CSI-RS and SS/PBCH block resources, when resource-wise quasi co-located with 'QCL-Type C' and 'QCL-TypeD' when applicable.
the UE may be configured with CSI-RS resource setting up to 16 USERS resource sets having up to 64 resources within each set. The total number of different USERS resources over all resource sets is no more than 128.

For L1-RSRP repotting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

In addition, in the present disclosure, L1-RSRQ and L1-SINR may be defined as follows.

First, L1-RSRQ may be configured to satisfy the following equation.

$$RSRQ = \frac{RSRP}{RSSI} \quad \text{[Equation 1]}$$

In the equation above, RSSI may include a linear average of the total power received from all sources (e.g., co-channel serving and non-serving cells, adjacent channel interference, thermal noise, etc.). RSSI includes both interference and noise as well as power of a desired signal. Accordingly, as the power of the desired signal becomes dominant, the value of RSSI may become very close to 1. Therefore, the RSSI cannot be self-contained feedback information for beam selection of TRP. In other words, RSRP always needs to carry RSRQ in addition to CRI/SSBRI.

In the present disclosure, L1-SINR may be configured to satisfy the following equation.

$$SINR = \frac{RSRP}{\text{Interference power} + \text{thermal noise}} \quad \text{[Equation 2]}$$

According to the definition of SINR, in the high SINR region, SINR may serve as RSRP in terms of beam reporting. Alternatively, in a mid-to-low SINR region, SINR may reflect an interference condition for each beam. This is because the denominator for determining SINR does not include co-channel power from serving cells. Accordingly, SINR may be self-contained feedback information. Therefore, SINR may be interpreted as more appropriate feedback information than RSRQ.

2. Features of Terminal and Base Station Applicable to the Present Disclosure 2.1. L1-SINR Based on IMR (e.g. CSI-IM, ZP CSI-RS, Etc.) and Methods for Sub-Time-Unit Less than 1 Symbol Terms used in the present disclosure are defined as follows.

In the present disclosure, a method for a signal to interference and noise ratio (L1-SINR) measurement using a ZP CSI-RS (or CSI-IM) will be mainly described. However, all configurations proposed in the present disclosure are not limited to the SINR measurement operation, and may be extended to or replaced with a reference signal received quality (RSRQ) according to an embodiment.

In addition, in the present disclosure, the term "NZP CSI-RS resource" may be replaced with "NZP CSI-RS."

In addition, in the present disclosure, a resource configured for/allocated to a UE for the purpose of channel measurement is referred to as a channel measurement resource (CMR), and a resource configured for/allocated to a UE for the purpose of interference measurement is referred to as an interference measurement resource (IMR). Here, IMR may be replaced with the term "CSI-IM." Alternatively, the IMR may include a zero power (ZP) IMR on which transmission of a specific reference signal (RS) is substantially skipped and a non-zero power (NZP) IMR on which the specific RS is transmitted. Here, according to an embodiment, the term "ZP IMR" may be extended to/replaced with "ZP CSI-RS." In this case, the ZP CSI-RS may be an RS that is configured/designated not only for interference measurement, but also for PDSCH rate matching.

Thus, in the present disclosure, measuring interference based on "ZP CSI-RS" may have the same meaning as measuring interference using "ZP IMR."

Hereinafter, based on the description above, resources on which a UE measures interference are collectively referred to as IMRs.

Specific operation examples disclosed in this section may be effective under the condition that a ZP CSI-RS is defined (e.g., overlapped) on the RE in which CSI-IM is defined. Alternatively, when the ZP CSI-RS is defined (e.g., overlapped) in all RE positions where CSI-IM is defined, a UE may assume that the PDSCH is transmitted at the CSI-IM RE positions if the PDSCH and the CSI-IM resources are frequency division multiplexed on the same OFDM symbol for the UE. Accordingly, the BS and the UE may not perform rate matching on the RE on which CSI-IM is defined.

In other words, the BS needs to configure the ZP CSI-RS at the CSI-IM RE position such that the UE may perform rate matching on the RE. Accordingly, the operation examples disclosed in this section may be effectively applied under the condition that the ZP CSI-RS is configured at the CSI-IM RE position.

When the PDSCH and the CSI-IM resources are not subjected to FDM on the same OFDM symbol, the UE may not need the ZP CSI-RS. In this case, the examples disclosed in this section may be applied regardless of whether presence/absence of the ZP CSI-RS is configured. Alternatively, for consistency with the above-described case of FDM with the PDSCH, the examples described in this section may be effectively applied only under the condition that the ZP CSI-RS is configured.

In the existing NR Rel-15 system, the UE may be allowed to perform RSRP reporting for beam management. Here, RSRP may be an index that simply indicates the received signal power, and does not reflect the strength of interference. Accordingly, when the BS Tx beam and/or the UE Rx beam are selected simply considering only the RSRP, a BS Tx beam and/or a UE Rx beam undergoing strong interference may be selected even when the RSRP is high.

In order to address such an issue, examples of a SINR reporting method considering interference for beam management will be described. More specifically, based on the previously defined CSI-ReportConfig and IMR (e.g., ZP CSI-RS, CSI-IM, etc.), a method for measuring interference signal power required for the UE to calculate SINR will be described in detail.

In the existing NR Rel-15 system, the BS may set NZP CSI-RS resource set with one more resources and repetition='on' for the UE such that the UE may perform the P3 operation. In this case, the UE may find an optimal Rx beam by sweeping the UE Rx beam per OFDM symbol unit (e.g., sub time unit=1).

The BS may generate a reference signal repeating N times within one OFDM symbol period (e.g., a reference signal having the same signal waveform that repeats N times within one OFDM symbol period) in the time domain, based on the IFDMA scheme or a larger subcarrier spacing. In this case, the UE may find the optimum Rx beam by sweeping the UE Rx beam N times in one OFDM symbol period (wherein sub-time unit=1/N may be configured). Accordingly, RS overhead may be reduced to 1/N, and the latency time according to the RS may also be reduced.

In the following description, repeatedly transmitting a specific signal N times within a predetermined time period in the time domain may include repeatedly receiving the same signal (or the same signal waveform) N times in the predetermined time period from the perspective of the reception node (e.g., the UE). Accordingly, the reception node may perform Rx beam sweeping up to N times based on (or on the assumption) that the same signal (or the same signal waveform) is repeated N times within the predetermined time period.

In view of the above, in the present disclosure, a method of defining a reference signal repeating in the time domain based on CSI-ReportConfig and IMR (e.g., ZP CSI-RS, CSI-IM, etc.), and a specific operation example of the UE based thereon will be described in detail.

Figure 6:
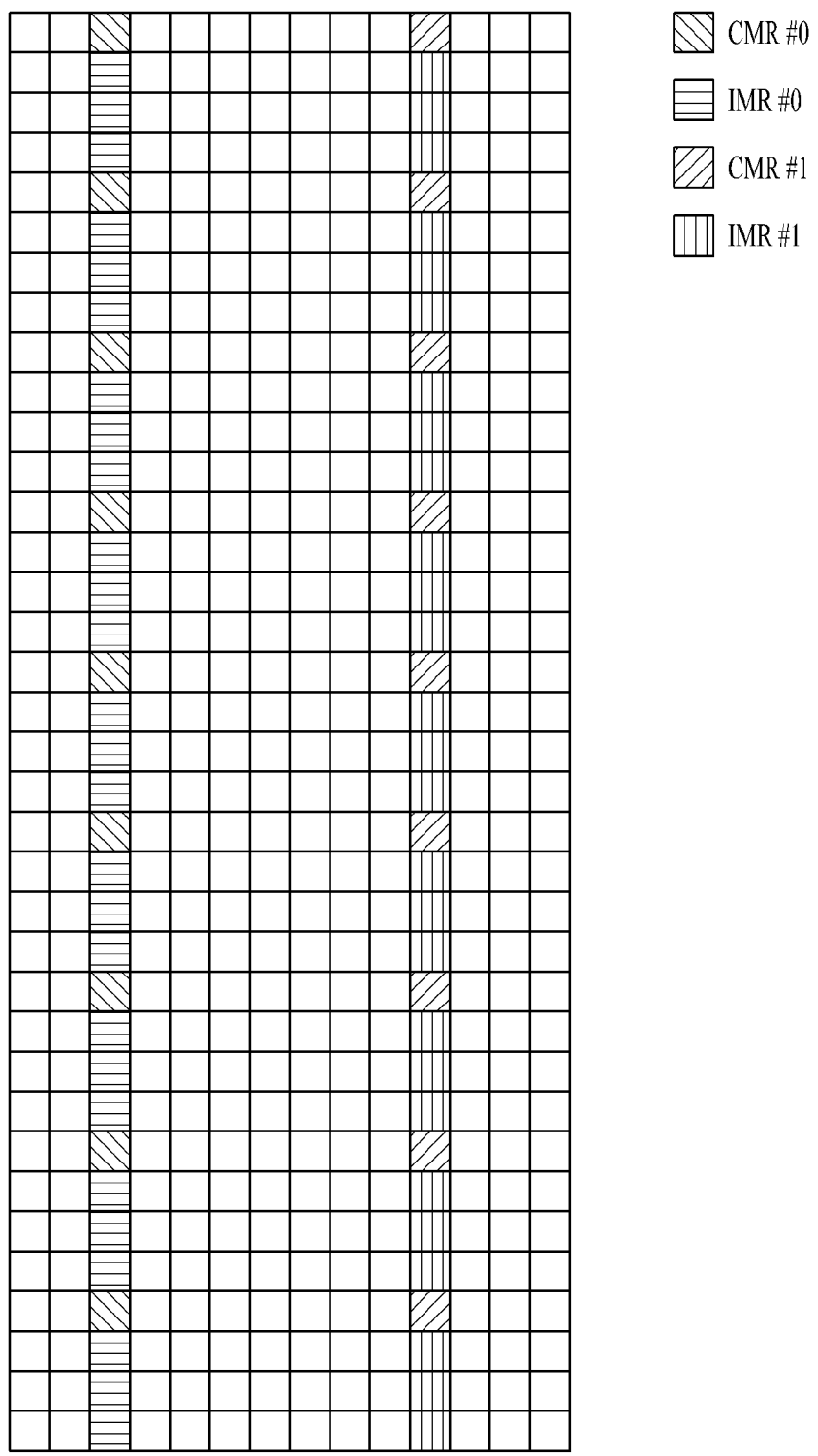
FIGS. 6 to 8 are reference diagrams illustrating an example operation of a terminal applicable to the present disclosure.
Figure 7:
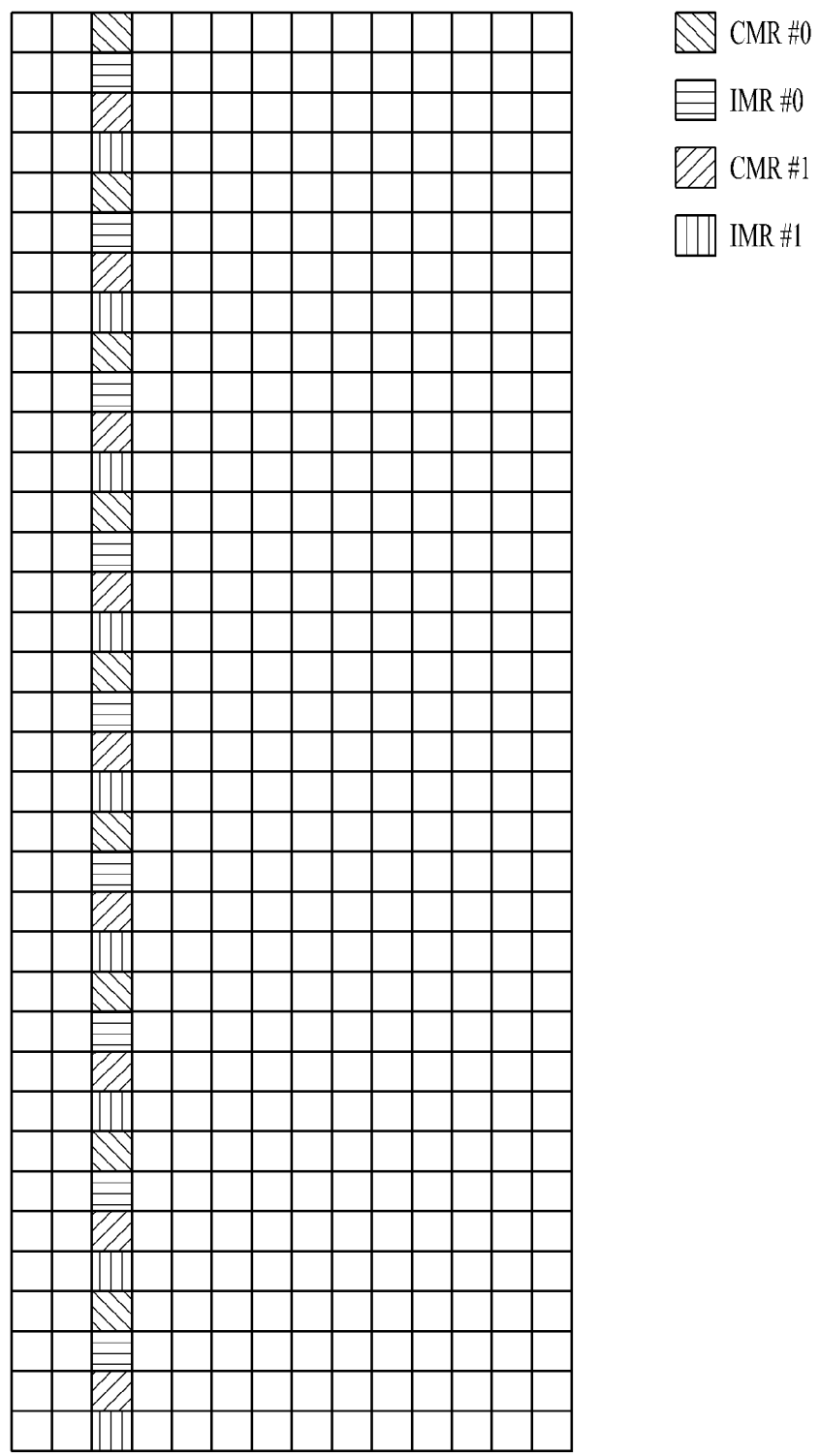
Figure 8:
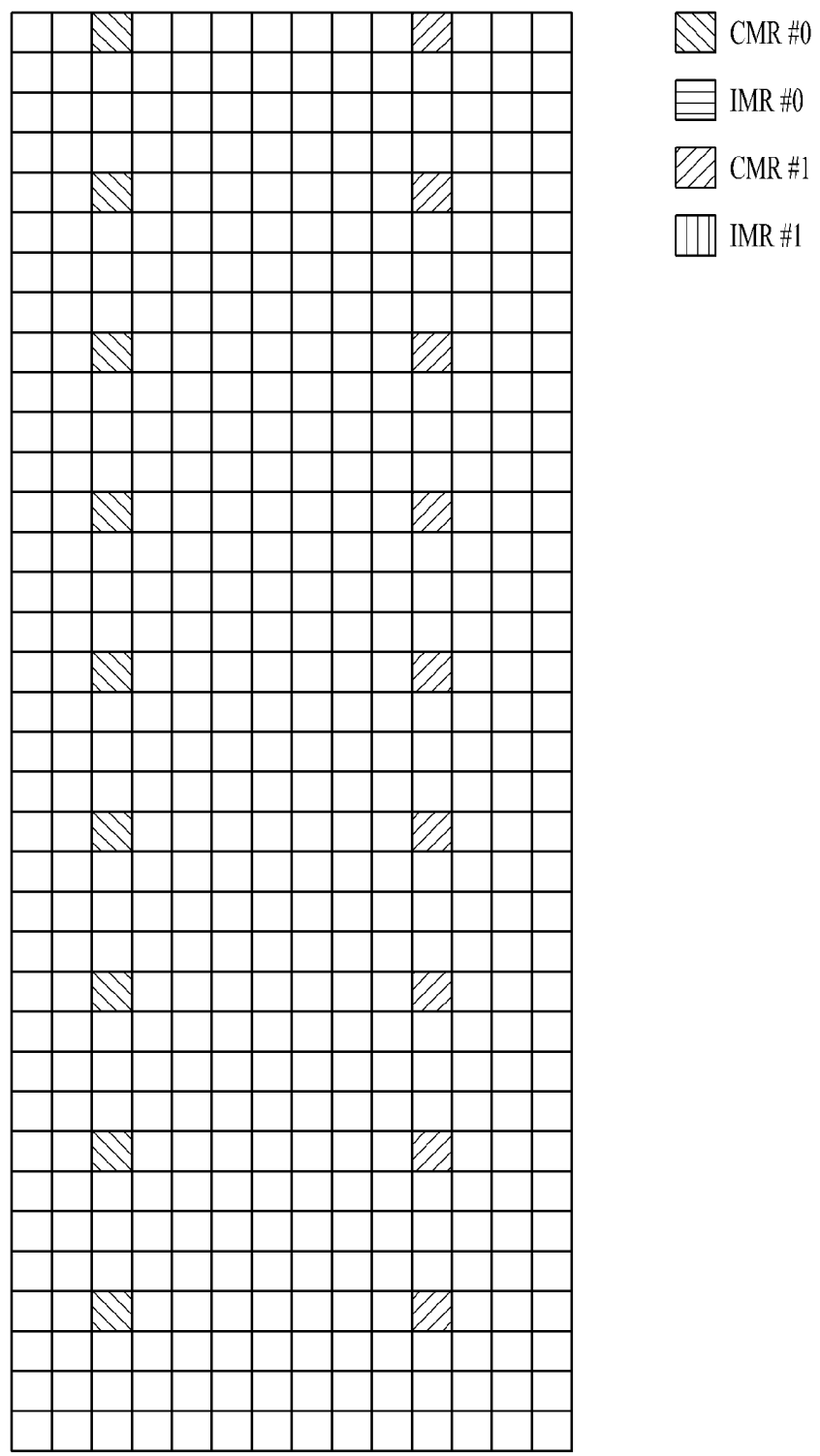

FIGS. 6 to 8 are reference diagrams illustrating operation examples of a UE applicable to the present disclosure. Hereinafter, operation examples of a UE and a BS applicable to the present disclosure will be described in detail with reference to the drawings.

2.1.1 First Operation Example

According to a first operation example applicable in the present disclosure, an IMR having a single port CMR (e.g., NZP CSI-RS resource) and an (N−1, 1) RE pattern (e.g., ZP CSI-RS, CSI-IM, etc.) may be configured to be frequency domain multiplexed on the same OFDM symbol (in an interleaved manner). Here, the (A, B) RE pattern may refer to an RE pattern determined based on A consecutive subcarriers in the frequency domain and B consecutive symbols in the time domain.

Thus, the CMR (e.g., NZP CSI-RS) may be configured such that the same signal (or the same signal waveform) in the time domain is repeated N times on one OFDM symbol (e.g., sub-time-unit=1/N).

As an example, as shown in FIG. 6, a CMR (e.g., NZP CSI-RS resource) #0 related to a single antenna port and an EIR (e.g., ZP CSI-RS, CSI-IM, etc.) having a (3, 1) RE pattern may be frequency domain multiplexed on the same OFDM symbol in an interleaved manner. In this case, the CMR (e.g., NZP CSI-RS resource) may be configured such that the same signal (or the same signal waveform) in the time domain is repeated 4 times on one OFDM symbol.

2.1.2. Second Operation Example

According to the second operation example applicable in the present disclosure, when at least one of the following conditions is satisfied and "Report (L1) RSRP" or "Report nothing" is configured for the UE (e.g., ReportQuantity='cri-RSRP' or 'none'), the UE may assume that the received RS (e.g., CSI-RS) is configured to be repeated N times on one OFDM symbol in the time domain. In other words, when the conditions are satisfied, the UE may assume that the received RS (or the waveform of the received RS) is configured to be repeated N times on one OFDM symbol. The "following conditions" considered for the above-described operation in the time domain may include the following conditions.

Condition #1: The number of ports of a CMR (e.g., NZP CSI-RS resource) is 1;
Condition #2: The IMR (e.g. ZP CSI-RS, CSI-IM, etc.) RE pattern is (1, 1) or (3, 1) or (7, 1); and
Condition #3: In terms of resources, a specific CMR (e.g., NZP CSI-RS resource) in the (resource-wise) NZP CSI-RS resource set and an IMR corresponding to the specific CMR in the set of IMRs (e.g. ZP CSI-RS, CSI-IM, etc.) are frequency domain multiplexed (in an interleaved manner) on the same OFDM symbol in the frequency domain, based on the resources included in the set of CMRs (e.g. NZP CSI-RS resource) for channel measurement (e.g., resourceForChannelMeasurement) and the set of IMRs (e.g., ZP CSI-RS, CSI-IM, etc.) for interference measurement (e.g., csi-IM-ResourceForInterference or ZP-CSI-RS-Resource-Set, etc.).

In this case, the UE may perform UE Rx beam sweeping up to N times within one OFDM symbol period based on the RS, thereby finding an optimum UE Rx beam (e.g., P3 operation).

As a specific example, it is assumed that the following two resource sets are configured for the UE: resourceForChannelMeasurement={NZP CSI-RS resource #0, NZP CSI-RS resource #1}, csi-IM-ResourceForInterference={ZP CSI-RS resource #0, ZP CSI-RS resource #1}. It is also assumed that the number of antenna ports for CMR (e.g., NZP CSI-RS resource) is configured as 1, and the RE pattern for IMR (e.g., ZP CSI-RS, CSI-IM, etc.) is configured as a (3, 1) RE pattern.

Referring to FIG. 6, for each of a CMR (e.g., NZP CSI-RS resource) set and an IM R (e.g., ZP CSI-RS resource, CSI-IM, etc.) set configured for the UE, resource-wise corresponding resources may be configured to be frequency domain multiplexed in an interleaved manner on the same OFDM symbol in the frequency domain. That is, according to FIG. 6, Conditions #1, #2, and #3 described above may all be satisfied.

In this case, when ReportQuantity='cri-RSRP' or 'none' is configured for the UE, the UE may assume that a received RS (e.g., CSI-RS) is transmitted in a manner that the same signal (or the same signal waveform) is repeated 4 times on one OFDM symbol in the time domain. Thus, the UE may find an optimum Rx beam based on up to four Rx beams for each resource, thereby selecting an optimum BS Tx beam (e.g., NZP CSI-RS resource) and UE Rx beam more accurately.

According to the method defined in the conventional NR Rel-15 standard, the UE measures RSRP for each resource on the assumption of one Rx beam, and accordingly may select an optimum BS Tx less accurately than in the method applicable in the present disclosure. That is, according to the present disclosure, an optimum BS Tx beam and UE Rx beam may be selected more accurately than in the method defined in the conventional standard.

In the second operation example, even when the same RS (or waveform of the RS) is repeatedly transmitted 4 times on one OFDM symbol, the UE may select an optimum BS Tx beam using one Rx beam. In this case, the UE loses an Rx beam sweeping opportunity (i.e., an opportunity for selection of an optimum UE Rx beam), but may be advantageous in terms of received power as the four repeated signals are received with one Rx beam and then accumulated. As a result, the operation may be useful when the path-loss is large.

Alternatively, In the above case, the UE may select an optimum BS Tx beam using two Rx beams. In this case, the UE may accumulate two repeatedly transmitted signals based on one Rx beam, and may perform Rx beam sweeping twice.

As described above, whether the UE is to (i) use the received repeated signals for Rx beam sweeping or (ii) receive and accumulate the repeatedly transmitted signals based on a specific fixed Rx beam may depend on the implementation issue of the UE.

As another example, as shown in FIG. 7, an IMR (e.g., ZP CSI-RS resource, CSI-IM, etc.) RE pattern may be configured as a (1, 1) RE pattern, and two CMRs may be configured to be frequency domain multiplexed in an interleaved manner on one OFDM symbol. In this case, the UE may assume that the two CMRs are different BS Tx beams (e.g., the UE may assume that the Tx filters (or Tx coefficients) used on the two CMRs are different or not the same). In this case, the UE may measure a total of eight beam pairs (e.g., two BS Tx beams and four UE Rx beams) on one OFDM symbol.

As a result, according to FIG. 7, RS overhead required for selection of the optimum BS Tx beam and UE Rx (e.g., P1 operation) may be reduced by half compared to the case of FIG. 6. The latency for the operation may also be reduced.

2.1.2.1. First Additional Operation Example for the Second Operation Example

In the second operation example this way above, the UE may determine the number of repetitions N based on the configured IMR RE pattern.

For example, when the RE patterns are (1, 1), (3, 1), and (7, 1), N may be determined as/configured with 2, 4, or 8, respectively. In this case, when the IMR RE patterns are configured as (1, 1) and (3, 1), CMR and IMR may be transmitted on a resource block (RB)-by-RB basis. Alternatively, when the IMR RE pattern is configured as (7, 1), CMR and IMR may be transmitted in units of two RBs.

In Condition #1 for the second operation example described above, a case where the IMR RE pattern is (1, 1) or (3, 1) or (7, 1) is considered. This is because, when such an RE pattern is used, an RS (e.g., CSI-RS) may be repeatedly transmitted exactly 2, 4, and 8 times in the time domain. More specifically, it is assumed that the size of the Inverse Fourier Transform (IFFT) and/or Fast Fourier Transform (FFT) is $2^q$ (where q is an integer), and the above-mentioned characteristics may be given only when the frequency RE interval configured with CMR is $2^n$ REs (where n is an integer). This may be because the IMR RE pattern may be configured as (1, 1), (3, 1), or (7, 1).

When it is assumed that the (2, 1) or (4, 1) RE pattern is used as an IMR RE pattern, the RS may be repeatedly transmitted three or five times on one OFDM symbol in the time domain. However, since the signals on the repetitive transmissions are not exactly the same (assuming the existing IFFT and/or FFT size), the performance may be reduced in the P3 operation.

Thus, when a divisor of the IFFT and/or FFT size is configured with 3 or 5 (e.g., the IFFT and/or FFT size is divided by 3 or 5), the repeatedly transmitted signals (or signal waveforms) may be exactly identically configured even when the (2, 1) or (4, 1) RE pattern is used as the IMR RE pattern.

Therefore, Condition #1 considered in the second operation example according to the present disclosure may not be limited to the case where the RE pattern is (1, 1), (3, 1), or (7, 1), and additional RE patterns may be considered in some cases (e.g., a case where the divisor of the IFFT and/or FFT size is configured with 3 or 5).

2.1.2.2. Second Additional Operation Example for the Second Operation Example

When transmission is performed in a manner that one CMR is repeated N times on one OFDM symbol in the time domain, whether the UE can find an optimum UE Rx beam based on the CMR using N Rx beams may be defined by UE capability. When the UE sends a report to the BS to inform that the UE does not support the operation, the UE may not expect that a sub-time unit may be configured to be shorter than 1 OFDM symbol length for the P3 operation. In other words, when the UE sends a report to the BS to inform that the UE does not support the operation, the UE may expect that the sub-time unit is configured with 1 OFDM symbol length for the P3 operation.

According to the second operation example described above, the UE may find an optimum Rx beam based on up to N Rx beams for each resource. However, in consideration of the above-described implementation issue of the UE, the UE may not always perform the above-described operation.

Accordingly, whether the UE supports the operation may be defined by the UE capability, and the UE may report the UE capability to the BS. In the case where the UE sends a report to the BS that the operation cannot be performed, the BS may configure NZP CSI-RS resource set with one more CSI-RS resources and repetition='on' for the P3 operation for the UE. (In this case, the sub-time unit may be configured with 1 OFDM symbol length).

2.1.2.3. Third Additional Operation Example for the Second Operation Example

In the second operation example described above, the BS may additionally indicate, to the UE through a separate parameter, that an RS (e.g., NZP CSI-RS resource) is repeatedly transmitted N times on one OFDM symbol in the time domain. Here, the parameter may be configured for the UE through an higher layer parameter (e.g., a media access control-control element (MAC-CE), radio resource control (RRC), etc.). Accordingly, when the UE receives the configuration of the parameter from the BS, the UE may assume that the received RS (e.g., NZP CSI-RS resource) is repeatedly transmitted N times on one OFDM symbol in the time domain.

More specifically, considering Condition #3 of the second operation example described above, it should be checked whether the resources included in two resource sets (e.g., the CMR set and the IMR set) configured for the UE are frequency division multiplexed in an interleaved manner on the same OFDM symbol resource-wise in the frequency domain. Such checking operation may increase the operation complexity of the UE.

In this additional operation example, in order to address the above-described issue, a scheme in which the BS configures, for the UE, a separate parameter indicating that an RS is repeatedly transmitted N times may be applied.

Here, the separate parameter may be configured in various ways. For example, it may be defined as a new IE not defined in the conventional 3GPP NR specification, or as a new higher layer parameter in the CSI-ReportConfig IE defined in the conventional 3GPP NR specification.

The BS may configure the parameter for the UE through the RRC, and/or MAC-CE, and/or DCI.

When the parameter is configured for the UE, the UE may expect that the resources included in two resource sets (e.g., CMR set and IMR set, etc.) configured for the UE will be subjected to FDM in an interleaved manner on the same OFDM symbol resource-wise in the frequency domain. In other words, when the parameter is configured for the UE, the UE may assume that the configured CMR is repeatedly transmitted N times on one OFDM symbol.

As a specific example, the parameter applicable in the third additional operation example may be defined as sub-TimeUnitlessthan1 in the CSI-ReportConfig IE as follows. However, this name of the parameter is merely one example applicable in the present disclosure, and the parameter may have another name according to an example. Additionally, in consideration of SINR report, reportQuantity may additionally include cri-SINR.

TABLE 12

CSI-ReportConfig {
ReportConfigID
Carrier
resourceForChannelMeasurement
csi-IM-ResourceForInterference
subTimeUnitlessthan1
reportConfigType
    Periodic
    SP
    Aperiodic
reportQuantity TABLE 12-continued

```
        none
        cri-RSRP
        cri-SINR
}
```

2.1.3. Third Operation Example

When the conditions according to the above-described second operation example (e.g., Conditions #1, #2, #3) are satisfied and L1-SINR report is configured for the UE (e.g., ReportQuantity='cri-SINR'), the UE may assume that an RS (e.g., NZP CSI-RS resource) transmitted from the BS is repeatedly transmitted once on one OFDM symbol in the time domain.

In order for the UE to calculate the SINR, accurate measurement of interference signal power is required. When an IMR (e.g., ZP CSI-RS, CSI-IM, etc.) on which a desired signal is not transmitted is used for SINR calculation, the UE may more accurately measure the interference signal power. To this end, the UE should assume that an RS (e.g., CSI-RS) transmitted from the BS (the same signal) is repeatedly transmitted once on one OFDM symbol in the time domain. Accordingly, the UE may measure the interference signal power on the RE configured as an IMR by applying FFT (or Discrete Fourier Transform (DFT)) to the received signal.

For example, when the UE applies the FFT to only one of the repeated signals on the assumption that the received RS is repeatedly transmitted four times for a predetermined time period, the UE may not find an RE to/for which ZP CSI-RS is mapped/configured in the frequency domain, and therefore accurate SINR calculation may not be performed.

2.1.4. Fourth Operation Example

When only the CMR set is configured for the UE and (L1) SINR report is configured for the UE (e.g., ReportQuantity='cri-SINR'), the UE may measure the received power of a desired signal and interference signal received power based on the CMR. Then, the UE may calculate the SINR based on the two measured values.

As shown in FIG. 8, when the CMR (e.g., NZP CSI-RS resource) is configured at intervals of 4 REs in the frequency domain, the UE may acquire sufficient samples in the frequency domain, and perform more accurate channel estimation based thereon. In addition, after the channel estimation, the UE may remove a desired signal from an RE configured as a CMR with higher accuracy. Then, the UE may measure the interference signal received power based on the signal in the RE remaining after the removal.

Thus, according to the fourth operation example, an RE used for the interference estimation is not defined separately, and therefore RS overhead may be greatly reduced.

Figure 9:
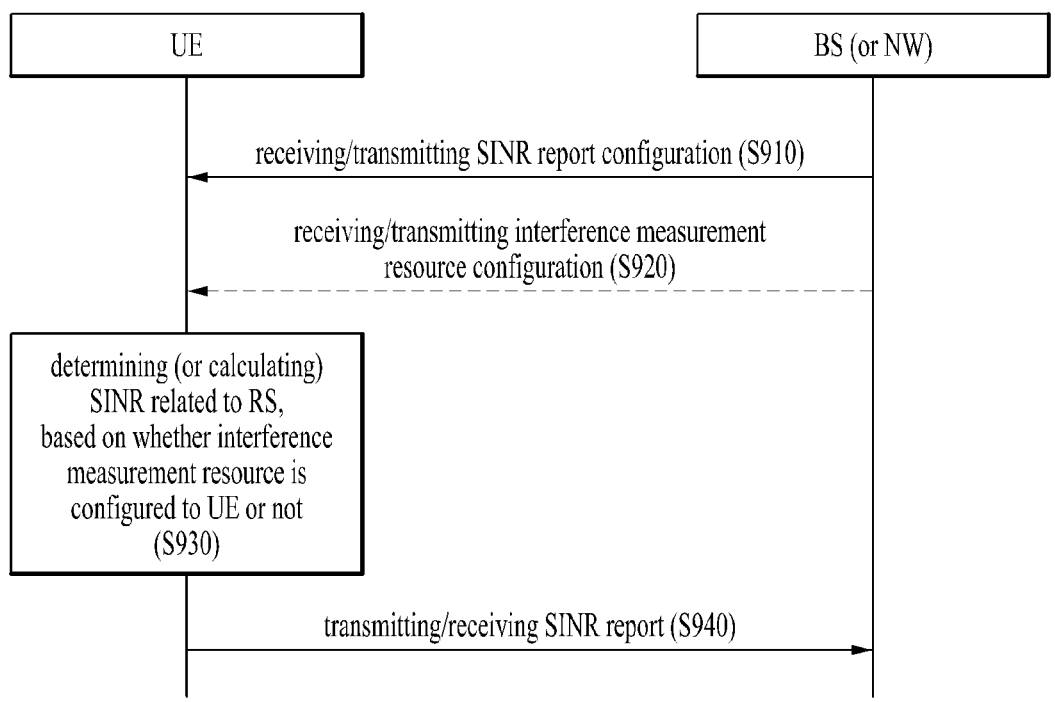
FIG. 9 is a diagram schematically illustrating an example operation of a terminal and a base station according to an example of the present disclosure.
Figure 10:
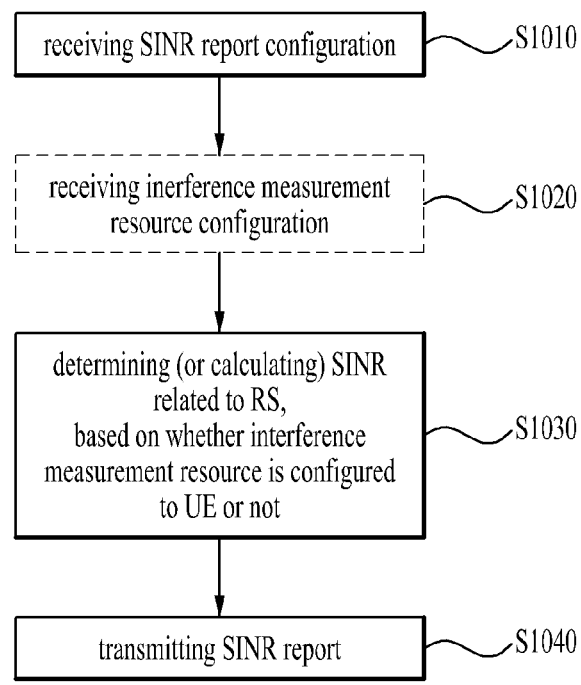
FIG. 10 is a flowchart schematically illustrating an example operation of a terminal according to an example of the present disclosure.
Figure 11:
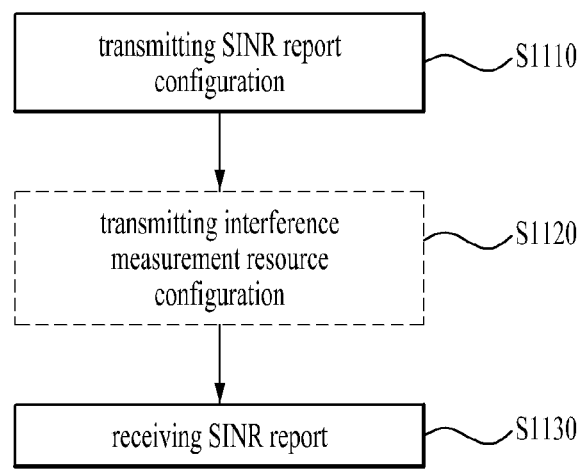
FIG. 11 is a flowchart schematically illustrating an example operation of a base station according to an example of the present disclosure.

FIG. 9 is a diagram schematically illustrating an operation example of a terminal and a base station according to an example of the present disclosure, FIG. 10 is a flowchart schematically illustrating an operation example of a terminal according to an example of the present disclosure, and FIG. 11 is a flowchart schematically illustrating an operation example of a base station according to an example of the present disclosure.

A UE according to the present disclosure may receive an SINR report configuration from a BS (S910, S1010). As a corresponding operation, the BS may transmit the SINR report configuration to the UE (S910, S1110).

As an example, the SINR report configuration may be transmitted and received through higher layer signaling (e.g., RRC signaling, etc.). As another example, the SINR report configuration may be transmitted and received through DCI.

The UE may or may not receive an interference measurement resource configuration from the BS (S920, S1020). More specifically, when the UE receives the interference measurement resource configuration from the BS, an interference measurement resource may be configured for the UE. On the other hand, when the UE does not receive the interference measurement resource configuration from the BS, no interference measurement resource may be configured for the UE. Thus, the BS may or may not transmit the interference measurement resource configuration to the UE (S920, S1120).

On the basis of the SINR report configuration, the UE may perform the following operations (S930, S1030).

(i) When an interference measurement resource related to a channel measurement RS resource is configured for the UE, an SINR related to the channel measurement RS resource may be calculated based on a first interference measurement result calculated based on the interference measurement resource.

(ii) Alternatively, when the interference measurement resource related to the channel measurement RS resource is not configured for the UE, an SINR related to the channel measurement RS resource may be calculated based on a 0 second interference measurement result calculated based on the channel measurement RS resource.

The UE may report the SINR calculated with the above method to the BS (S940, S1040). In response, the BS may receive the calculated SINR report from the UE (S940, S1130).

In the configuration above, a non-zero power channel state information-reference signal (NZP CSI-RS) or a synchronization signal/physical broadcast channel block received through the channel measurement RS resource may be included, and the interference measurement resource may include a zero power (ZP) interference measurement resource or a non-zero interference measurement resource.

In the configuration above, the channel measurement RS resource and the interference measurement resource may be configured on one orthogonal frequency division multiplexing (OFDM) symbol.

To this end, the channel measurement RS resource and the interference measurement resource may be configured on the one OFDM symbol according to frequency division multiplexing (FDM).

In the configuration above, the calculation of the SINR related to the channel measurement RS resource by the UE based on the first interference measurement result calculated based on the interference measurement resource may include calculating, by the UE, an SINR related to the channel measurement RS resource based on the first interference measurement result on an assumption that an RS received through the channel measurement RS resource is repeatedly transmitted once on the one OFDM symbol in the time domain.

In the configuration above, based on that the interference measurement resource is not configured for the UE, the UE refers to the channel measurement, the calculation of the SINR related to the channel measurement RS resource by the UE based on the second interference measurement result calculated based on the channel measurement RS resource may include the following operations:

performing channel estimation based on the channel measurement RS resource;

calculating the second interference measurement result by removing a desired signal detected through the channel estimation from the channel measurement RS resource; and calculating an SINR related to the channel measurement RS resource based on the second interference measurement result.

Here, based on that the interference measurement resource is not configured for the UE, the channel measurement RS resource in one resource block (RB) may be configured on at least three subcarriers.

Alternatively, based on that the interference measurement resource is not configured for the UE, the channel measurement RS resource may be configured on a plurality of REs having a constant resource element (RE) interval on one orthogonal frequency division multiplexing (OFDM) symbol.

In the disclosure above, the SINR may include a first layer (L1)-SINR.

3. Specific Operation Examples of UE and BS Proposed in the Present Disclosure (Methods for a Plurality of CMRs (e.g., NZP CSI-RS, Etc.) Sharing One or More IMRs (e.g., CSI-IM, ZP CSI-RS, etc.)

In the following description, the term QCL-D source may mean QCL characteristics (or QCL information) defined (or indicated) by qcl-Type2 in the TCI-state.

In the following description, unless stated otherwise, a "CSI-RS resource" may mean a "NZP CSI-RS resource for channel measurement." Here, the NZP CSI-RS resource may be used for tracking (e.g., TRS), and/or beam management, and/or CSI acquisition. In addition, "CSI-IM" may be replaced with "ZP CSI-RS resource."

In addition, in the present disclosure, a resource configured/allocated to a UE for channel measurement is called a channel measurement resource (CMR), and a resource configured/allocated to a UE for interference measurement is called an interference measurement resource (IMR). Here, IMR may be replaced with the term "CSI-IM." Alternatively, the IMR may include a zero power (ZP) IMR on which a specific reference signal (RS) is not substantially transmitted and a non-zero power (NZP) IMR on which a specific RS is transmitted. According to an embodiment, the term "ZP IMR" may be extended to/replaced with "ZP CSI-RS." Here, the ZP CSI-RS may be an RS configured/designated for PDSCH rate matching as well as interference measurement (or rather than interference measurement).

In the following description, "CSI-IM" may be extended to "NZP CSI-RS for interference management." In other words, in the following description, the present disclosure may include all configurations in which "CSI-IM" is replaced with "NZP CSI-RS for interference management."

In the Rel-15 NR system to which the present disclosure is applicable, in order to calculate/acquire CSI (i.e., CRI, and/or RI, and/or PMI, and/or CQI), the BS may configure an NZP CSI-RS for channel measurement for the UE. At the same time, the BS may additionally configure a CSI-IM resource (or a ZP CSI-RS resource) for interference measurement for the UE.

In the Rel-15 multiple input multiple output (MIMO) beam management system, the beam-related reporting metric may include only L1-RSRP. In this case, the BS may configure only NZP CSI-RS resources for channel measurement to the UE. In other words, in this case, the BS may not additionally configure a CSI-IM resource (or ZP CSI-RS resource) for interference measurement for the UE, or it may not be allowed to configure a CSI-IM resource (or ZP CSI-RS resource) for interference measurement.

However, in a new system (e.g., an NR system after Rel-16), L1-SINR as well as L1-RSRP may be supported as a beam-related reporting metric.

For the L1-SINR, a separate resource (e.g., CSI-IM resource or ZP CSI-RS resource, etc.) may be unnecessary because the UE is allowed to additionally measure interference from the NZP CSI-RS resource for channel measurement. However, when the received power from the configured NZP CSI-RS resource is less than the received power and/or noise power of the interference signal, the interference measurement performance may not guaranteed. This issue may be addressed through the implementation of a UE. However, in this case, a large number of samples may be required in the time domain. In other words, the implementation of the UE may raise a latency issue.

In consideration of the above, the BS needs to additionally configure a resource for interference measurement (e.g., a CSI-IM resource or a ZP CSI-RS resource) for the UE. However, in this case, additional RS overhead may be produced.

Therefore, in the present disclosure, a technique of causing multiple NZP CSI-RS resources for channel measurement to share one interference measurement resource (e.g., CSI-IM or ZP CSI-RS resource, etc.) will be described in detail as a method of reducing RS overhead.

In the present disclosure, the UE may perform CSI measurement based on the above-described configuration methods (e.g., the details of CSI reporting-related configurations disclosed in Section 1.9).

Referring to S.5.2.1.4.1 of the standard document TS 38.214 (see Table 13), when each of the CSI-IM resource set and the NZP CSI-RS resource set for channel measurement includes a plurality of resources, the resources from the different sets may be associated with (or mapped to) each other in a resource-wise order. For example, when NZP CSI-RS resource set={CSI-RS resource #2, CSI-RS resource #3} and CSI-IM resource set={CSI-IM #5, CSI-IM #7}, CSI-RS resource #2/#3 may be associated with (or mapped to) CSI-IM #5/#7, respectively. In this case, the UE may receive CSI-IM associated with a specific CSI-RS resource based on the Rx beam used to receive the specific CSI-RS resource.

TABLE 13

If interference measurement is performed on CSI-IM, each CSI-RS resource for channel measurement is resource-wise associated with a CSI-IM resource by the ordering of the CSI-RS resource and CSI-IM resource in the corresponding resource sets. The number of CSI-RS resources for channel measurement equals to the number of CSI-IM resources.

When the NZP CSI-RS resource set for interference measurement is used instead of the CSI-IM resource set, the association (or mapping) between the NZP CSI-RS resource for interference measurement and the NZP CSI-RS resource for channel measurement may be assumed to be the same as the association (or mapping) between the CSI-IM and the NZP CSI-RS resource for channel measurement. In other words, resources included in the NZP CSI-RS resource set may be associated with (or mapped to) resources included in the CSI-IM resource sets in a resource-wise order.

Accordingly, in the present disclosure, it is assumed that the above relationship is applied when the UE measures L1-SINR (or when reportQuantity is configured as L1-SINR).

Referring to S.5.2.1.2 of the standard document TS 38.214 (see Table 14), QCL-D of the CSI-IM (or the ZP CSI-RS resource or the NZP CSI-RS resource for interference measurement, etc.) may be configured to conform (correspond) to QCL-D of the NZP CSI-RS resource for measurement of the connected channel. For example, when NZP CSI-RS resource set={CSI-RS resource #2, CSI-RS resource #3} and CSI-IM resource set={CSI-IM #5, CSI-IM #7}, QCL-D of CSI-IM #5 may be configured to conform (or correspond) to the QCL-D of CSI-RS resource #2.

4) L1-SINR for CSI-RS resource #12=RSRP measured from CSI-RS resource #12/(Interference power measured from CSI-IM #32+alpha).

In 1) to 4) above, alpha denotes noise power. Alpha is 0 or a non-zero value and may be set through higher layer signaling (e.g., RRC signaling, MAC-CE, etc.).

In the example above, the QCL-D of the CSI-IM may conform (or correspond) to the QCL-D of the CSI-RS resource having an association therewith. When the UE is capable of defining multiple Rx beams at the same time (or

TABLE 14

Text proposal for TS38.214.
5.2.1.2-Resource settings.
--------------- omitted --------------
The UE may assume that the NZP CSI-RS resource(s) for channel measurement and the CSI-IM resource(s) for interference measurement configured for one CSI reporting are resource-wise QCLed with respect to 'QCL-TypeD'. When NZP-CSI-RS resource(s) is used for interference measurement, the UE may assume that the NZP CSI-RS resource for channel measurement and the CSI-IM resource and/or NZP CSI-RS resource(s) for interference measurement configured for one CSI reporting are QCLed with respect to 'QCL-TypeD'.

Figure 12:
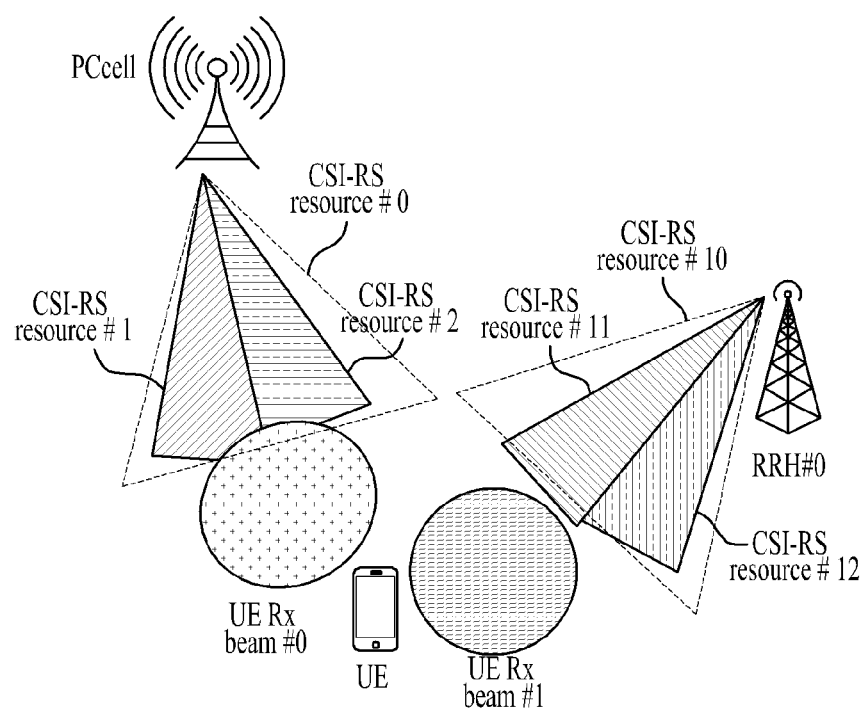
FIG. 12 is a diagram illustrating an example operation of a terminal and a base station according to the present disclosure.

FIG. 12 is a diagram illustrating an example operation of a UE and a BS according to the present disclosure.

In FIG. 12, a cell may configure six (NZP) CSI-RS resources (for channel measurement) for a UE. In FIG. 12, a smaller beam width may be configured for CSI-RS resource #1/#2 than for CSI-RS resource #0. In other words, CSI-RS resource #1/#2 may be configured to be included in CSI-RS resource #0. CSI-RS resource #10 and CSI-RS resource #11/#12 may also be configured in a similar manner (that is, CSI-RS resource #11/#12 may be configured to have a smaller beam width than CSI-RS resource #10 or configured to be included in CSI-RS resource #10).

As an example applicable to FIG. 12, CSI-RS for beam management/tracking (TRS) may be applied to CSI-RS resource #0/#10. Alternatively, in order to configure the same QCL-D of CSI-RS resource #1/#2, an SSB (SS/PBCH block) may be applied instead of CSI-RS resource #0.

The BS may group CSI-RS resources #1/#2/#11/#12 into one resource set, and may configure L1-SINR reporting for the UE based thereon.

In addition, the BS may additionally allocate separate CSI-IM for interference power measurement to the UE. To this end, based on the report configuration method for CSI calculation defined in the existing standard specification, the BS may configure a report for L1-SINR calculation for the UE as follows.

(1) NZP CSI-RS resource set={CSI-RS resource #1, CSI-RS resource #2, CSI-RS resource #11, CSI-RS resource #12}

(2) CSI-IM resource set={CSI-IM #21, CSI-IM #22, CSI-IM #31, CSI-IM #32}

Here, CSI-RS resources #1/#2/#11/#12 may have an association (resource-wise association) with CSI-IM #21/#22/#31/#32. Based on the above relationship, the UE may calculate the L1-SINR as follows:

1) L1-SINR for CSI-RS resource #1=RSRP measured from CSI-RS resource #1/(Interference power measured from CSI-IM #21+alpha);

2) L1-SINR for CSI-RS resource #2=RSRP measured from CSI-RS resource #2/(Interference power measured from CSI-IM #22+alpha);

3) L1-SINR for CSI-RS resource #11=RSRP measured from CSI-RS resource #11/(Interference power measured from CSI-IM #31+alpha); and the UE has the capability to control multiple Rx beams), the UE measure different interference powers as many as the number of (configured) Rx beams using a single CSI-IM resource.

On the other hand, when the UE is capable of defining only one Rx beam (or the UE has the capability to control only one Rx beam), CSI-RS resources with different QCL-Ds may not share (one) CSI-IM.

Figure 13:
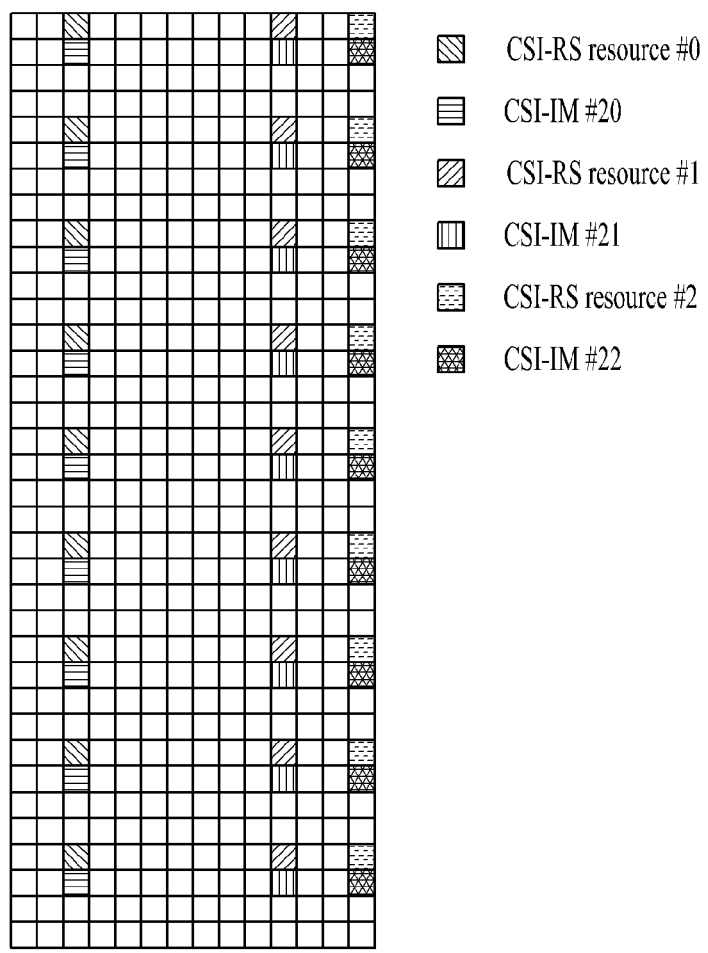
FIGS. 13 and 14 are diagrams schematically illustrating a mapping pattern of CSI-RS resources and CSI-IM resources according to an example of the present disclosure.

FIG. 13 is a diagram schematically illustrating a mapping pattern of CSI-RS resources and CSI-IM resources according to an example of the present disclosure.

In FIG. 13, it is assumed that QCL-Ds of CSI-RS resources #0/#1/#2 are set differently from each other. In this case, as shown in FIG. 13, the BS may configure a corresponding CSI-IM for each CSI-RS resource for the UE.

FIG. 13 illustrates a case where the CSI-IM pattern is a 1*1 pattern. However, in another example, the CSI-IM pattern may be changed to a 2*1, 3*1, 4*1, or 2*2 pattern.

In the present disclosure, the BS may configure another CSI-RS with a QCL-D source for a specific CSI-RS. In view of the above, when the BS configures CSI-RS resource #0 as the QCL-D source of CSI-RS resource #1/#2 (and thus the QCL-Ds of CSI-RS resources #0/#1/#2 are the same), the two CSI-RS resources may reuse CSI-IM #0. As a result, the BS does not need to separately configure CSI-IM #21 and CSI-IM #22 for the UE, and accordingly RS overhead may be reduced.

To this end, the NZP CSI-RS resource set for channel measurement and the CSI-IM resource set for interference measurement may be configured as follows, respectively.

<1> NZP CSI-RS resource set={CSI-RS resource #1, CSI-RS resource #2, CSI-RS resource #11, CSI-RS resource #12}.

CSI-RS resource #1/#2 have the same QCL-D source as CSI-RS resource #0;
CSI-RS resource #11/#12 have the same QCL-D source as CSI-RS resource #10.

<2> CSI-IM resource set={CSI-IM #20, CSI-IM #20, CSI-IM #30, CSI-IM #30}.

In the present disclosure, when CSI-RS resources #1/#2 configured by the BS for the UE have different QCL-D information, the UE may not expect the above configurations. This is because this CSI-IM configuration is incorrect.

Based on the discussion above, the BS and the UE according to the present disclosure may operate as follows.

Although each operation method will be described separately for convenience of explanation, the BS and the UE may carry out a combination of several operation methods below (except for physically impossible cases).

3.1. First Operation Method

The BS may configure a plurality of different NZP CSI-RS resources (e.g., NZP CSI-RS resources for channel measurement) for the UE such that the resources have the same QCL-D. In this case, the UE may expect that one shared CSI-IM corresponding to the NZP CSI-RS resources is configured (or the UE may expect that the same CSI-IM ID corresponding to the NZP CSI-RS resources is configured).

When different NZP CSI-RS resources (e.g., NZP CSI-RS resources for channel measurement) have the same QCL-D, the BS may configure the NZP CSI-RS resources for the UE such that the resources share one CSI-IM (or the BS may configure the same CSI-IM ID for the NZP CSI-RS resources).

Referring to the example of FIG. 12, CSI-RS resources #0/#10 may be configured with a wide beam, and may be configured to include CSI-RS resources #1/#2 and CSI-RS resources #11/#12, which correspond to fine beams, respectively, as shown in FIG. 12. In this case, the BS may explicitly/implicitly configure the following configuration for the UE:

(1) NZP CSI-RS resource set={CSI-RS resource #1, CSI-RS resource #2, CSI-RS resource #11, CSI-RS resource #12}:
   CSI-RS resource #1/#2 have the same QCL-D source as CSI-RS resource #0;
   CSI-RS resource #11/#12 have the same QCL-D source as CSI-RS resource #10;
(2) CSI-IM resource set={CSI-IM #20, CSI-IM #20, CSI-IM #30, CSI-IM #30}.

Unlike the above-described example, the BS may explicitly/implicitly establish the following configuration for the UE. According to this example, the number of CSI-IM resources may be set smaller than that of NZP CSI-RS resources. Accordingly, when the QCL-Ds of CSI-RS resources #1 and #2 are the same, the UE may expect that the two CSI-RS resources share one CSI-IM (e.g., CSI-IM #20). Similarly, when the QCL-Ds of CSI-RS resources #3 and #4 are the same, the UE may expect that the two CSI-RS resources share one CSI-IM (e.g., CSI-IM #30).

1) NZP CSI-RS resource set={CSI-RS resource #1, CSI-RS resource #2, CSI-RS resource #11, CSI-RS resource #12}:
   CSI-RS resource #1/#2 have the same QCL-D source as CSI-RS resource #0;
   CSI-RS resource #11/#12 have the same QCL-D source as CSI-RS resource #10;
2) CSI-IM resource set={CSI-IM #20, CSI-IM #30}.

As another example, the BS may explicitly/implicitly establish the following configuration for the UE. According to this example, the UE may expect that CSI-RS resources #1/#2/#3 share one CSI-IM (e.g., CSI-IM #20), and that CSI-RS resource #11 is associated with another CSI-IM (e.g. CSI-IM #30).

<1> NZP CSI-RS resource set={CSI-RS resource #1, CSI-RS resource #2, CSI-RS resource #3, CSI-RS resource #11}:
   CSI-RS resource #1/#2/#3 have the same QCL-D source as CSI-RS resource #0;
   CSI-RS resource #11 have the same QCL-D source as CSI-RS resource #10;
<2> CSI-IM resource set={CSI-IM #20, CSI-IM #30}.

As another example, the BS may explicitly/implicitly establish the following configuration for the UE. According to this example, CSI-RS resource #0 and CSI-RS resource #10 as QCL sources may be replaced with SSB #0 and SSB #1, respectively. Here, SSB #0/#1 may be defined as a wide beam as in the case of CSI-RS resource #0/#1.

According to this example, TRS, CSI-RS resource for beam management (BM), and SSB (Synch Signal/PBCH Block) may be applied as QCL-D sources of the CSI-RS resource for BM. In this example, SSB #0/#1 may be previously defined signals and may have a characteristic of an always on signal. Therefore, when the SSB replaces CSI-RS resources #0/#1, RS overhead may be reduced.

1> NZP CSI-RS resource set={CSI-RS resource #1, CSI-RS resource #2, CSI-RS resource #11, CSI-RS resource #12}:
   CSI-RS resource #1/#2 have the same QCL-D source as SSB #0;
   CSI-RS resource #11/#12 have the same QCL-D source as SSB #1;
2> CSI-IM resource set={CSI-IM #20, CSI-IM #20, CSI-IM #30, CSI-IM #30}.

In the above-described examples, each of the CSI-RS resource and the CSI-IM may implicitly have an association in a resource-wise order. In this case, in addition to the implicit method, the BS may explicitly configure/indicate the relationship between the plurality of NZP CSI-RS resources and the CSI-IM. To this end, as one scheme, the BS may configure/define/indicate CSI-IM corresponding to one or more NZP CSI-RS resources as one set. As an example, in the above-described example (CSI-RS resources #1/#2 share CSI-IM #20, and CSI-RS resources #3/#4 share CSI-IM #30), the BS may establish the following configuration for the UE.

{CSI-RS resource #1, CSI-RS resource #2, CSI-IM #20} and {CSI-RS resource #3, CSI-RS resource #4, CSI-IM #30}

In this way, a plurality of NZP CSI-RS resources (e.g., NZP CSI-RS resources for channel measurement) having the same QCL-D may be configured for the UE. The NZP CSI-RS resources may be connected/mapped to the same CSI-IM (or may have the same CSI-IM ID). In this case, the UE may measure one interference power from the CSI-IM and measure reference signal received power (RSRP) for each of the NZP CSI-RS resources. Then, it may calculate the L1-SINR of each CSI-RS resource using the RSRP and the interference power.

3.2. Second Operation Method

When multiple CSI-RS resources (e.g., NZP CSI-RS resources for channel measurement) have different QCL-D sources or correspond to different QCL-Ds, The UE may not expect the same CSI-IM to be configured for the plurality of CSI-RS resources (or may not expect the same CSI-IM ID to be configured for the plurality of CSI-RS resources).

In contrast, when multiple CSI-RS resources (e.g., NZP CSI-RS resources for channel measurement) have different QCL-Ds or correspond to different QCL-Ds, the BS may not configure the same CSI-IM for the multiple CSI-RS resources.

As a more specific example, the UE may not expect the following configuration to be established:

(1) NZP CSI-RS resource set={CSI-RS resource #1, CSI-RS resource #11}:
   CSI-RS resource #1 has the QCL-D source as CSI-RS resource #0;
   CSI-RS resource #11 has the QCL-D source as CSI-RS resource #10;

(2) CSI-IM resource set={CSI-IM #20, CSI-IM #20}.

3.3. Third Operation Method

In a case where QCL-D is not applicable to a UE (or 'QCL-TypeD' is not applicable), the UE may expect that multiple different CSI-RS resources (e.g., NZP CSI-RS resources for channel measurement) share one CSI-IM (or may expect that the same CSI-IM ID is configured for the multiple different CSI-RS resources (e.g., NZP CSI-RS resources for channel measurement).

Accordingly, for a UE to which QCL-D is not applicable, the BS may configure a plurality of NZP CSI-RS resources such that the resources share one CSI-IM.

Specifically, when QCL-D is not applicable, QCL-D may not be defined for CSI-IM. Accordingly, there is no restriction on the UE Rx beam. Therefore, the UE may (i) measure the interference power from one CSI-IM, and (ii) calculate a different L1-SINR for each CSI-RS resource using the RSRP measured from each NZP CSI-RS connected to the CSI-IM and the interference power.

3.4. Fourth Operation Method

The UE may not expect that CSI-RS resources (e.g., NZP CSI-RS for channel measurement) with different QCL-Ds and the CSI-IM are frequency division multiplexed on the same OFDM symbol. In this case, the QCL-D of a specific CSI-IM may conform (or correspond) to the QCL-D of a CSI-RS resource (e.g., NZP CSI-RS for channel measurement) having a linkage to the CSI-IM.

Accordingly, the BS may configure the CSI-RS resources (e.g., NZP CSI-RSs for channel measurement) with the same QCL-D and the CSI-IM so as to be subjected to FDM on the same OFDM symbol. In other words, for the CSI-RS resources (e.g., NZP CSI-RSs for channel measurement) having the same QCL-D and CSI-IM, the BS does not need to configure two different OFDM symbols (one for NZP CSI-RS for channel measurement and the other is for CSI-IM) for the UE. Accordingly, the UE may reduce the latency in calculating the L1-SINR. In addition, when the number of available OFDM symbols is limited, the BS and the UE may cause more beams to be subjected to TDM based on the method above.

Figure 14:
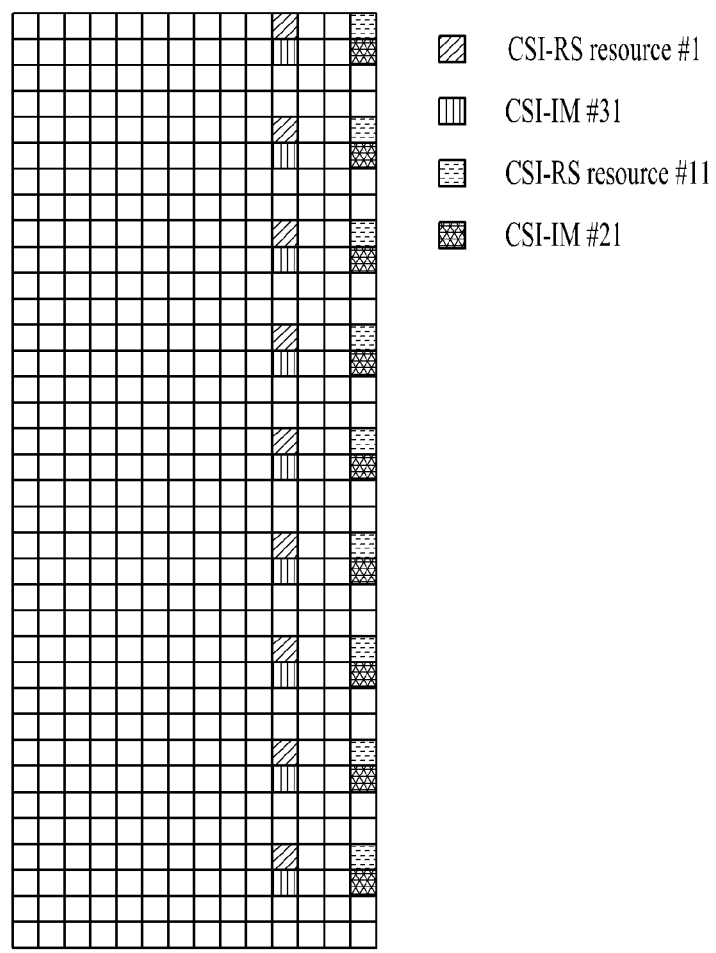

FIG. 14 is a diagram schematically illustrating a mapping pattern of CSI-RS resources and CSI-IM resources according to another example of the present disclosure.

In FIG. 14, it is assumed that the BS has configured an NZP CSI-RS resource set and a CSI-IM resource set for the UE as follows:

(1) NZP CSI-RS resource set={CSI-RS resource #1, CSI-RS resource #11}:
  CSI-RS resource #1 has the QCL-D source as CSI-RS resource #0;
  CSI-RS resource #11 has the QCL-D source as CSI-RS resource #10;
(2) CSI-IM resource set={CSI-IM #21, CSI-IM #31}.

Here, since CSI-IM #31 is associated with CSI-RS resource #11, CSI-IM #31 may conform (correspond) to the QCL-D of CSI-RS resource #11 or CSI-RS resource #10 (of the QCL-D source found through QCL-D linkage).

In addition, in FIG. 14, since the QCL-Ds of CSI-RS resource #1 and CSI-IM #31 are different from each other, they may be interpreted as meaning that the BS has configured two different UE Rx beams for the UE in order to receive a signal on one OFDM symbol. It may be interpreted as setting.

In this case, when it is assumed that the UE is allowed to operate only one Rx beam (e.g., only one Rx beam is allowed to be defined for the UE, or only one Rx beam is applicable according to the capability of the UE), such a configuration may be an incorrect configuration. For the same reason, CSI-RS resource #11 and CSI-IM #21 may be an incorrect configuration.

Accordingly, to prevent the above-described issue, the UE not expect a configuration in which CSI-RS resources (e.g., NZP CSI-RS for channel measurement) having different QCL-Ds and the CSI-IM are frequency division multiplexed on the same OFDM symbol.

3.5. Fifth Operation Method

In the first to fourth operation methods described above, the expression "having the same QCL-D" may mean that (i) the same QCL-D source is given, (ii) the QCL-D sources determined based on the QCL linkage are the same, or (iii) a QCL-D source and/or a QCL-D source determined based on the QCL linkage are the same.

Accordingly, whether CSI-IM is shared may be determined based on the QCL-D source configured for the NZP CSI-RS resource. As an example, the UE may determine whether CSI-IM is shared, considering only the QCL-D source configured for the NZP CSI-RS resource (e.g., the QCL-D source acquired through QCL linkage is not used). As another example, the UE may determine whether CSI-IM is shared based on the QCL-D source acquired through QCL linkage.

More specifically, suppose that the BS has configured the following CSI-RS resources (e.g., NZP CSI-RS resource for channel measurement) and CSI-IM for the UE:

(1) CSI-RS resource #0 has the QCL-D source as SSB #0;
(2) NZP CSI-RS resource set={CSI-RS resource #1, CSI-RS resource #2}:
  CSI-RS resource #1 has the QCL-D source as CSI-RS resource #0;
  CSI-RS resource #2 has the QCL-D source as SSB #0;
(3) CSI-IM resource set={CSI-IM #20, CSI-IM #20}.

From the configuration above, it may be seen that the QCL-Ds of CSI-RS resource #1 and #2 are different from each other. Accordingly, in operation method 5-1, the two CSI-RS resources may not share the same CSI-IM (i.e., when only the QCL-D source configured for the NZP CSI-RS resource is considered).

Alternatively, from the configuration above, it may be seen that CSI-RS resource #0, which is the QCL-D source of CSI-RS resource #1, has SSB #0 as the QCL-D source. Accordingly, based on the QCL-D source acquired through QCL linkage according to operation method 5-2, CSI-RS resources #1/#2 may be interpreted as having the same QCL-D. Accordingly, according to operation method 5-2, the two CSI-RS resources may share the same CSI-IM.

Operation methods 5-1 and 5-2 may have the following advantages/disadvantages.

3.5.1. Operation Method 5-1

Advantage: It is assumed that CSI-RS resource #0 corresponds to a narrower beam than SSB #0, and the UE has detected a better UE Rx beam (than when SSB #0 is used) using CSI-RS resource #0. In this case, the UE may use the better UE Rx beam (found using CSI-RS resource #0) in receiving CSI-RS resource #1. Therefore, the UE may report L1-SINR of a high quality to the BS. As a result, an improvement in throughput may be expected.

Disadvantage: CSI-IM cannot be shared in the configuration above.

3.5.2. Operation Method 5-2

Advantage: In contrast with operation method 5-1, when the QCL-D sources found through the QCL linkage are the same, the corresponding CSI-RS resources may share the same CSI-IM. Accordingly, additional reduction in RS overhead may be expected.

Disadvantage: It is assumed that CSI-RS resource #0 corresponds to a narrower beam than SSB #0, and the UE has detected a better UE Rx beam (than when SSB #0 is used) using CSI-RS resource #0. However, according to operation method 5-2, the UE should use the UE Rx beam (found using SSB #0) in receiving CSI-IM #20. Similarly, the UE should use the UE Rx beam found using SSB #0, not the UE Rx beam found through CSI-RS resource #0 in receiving CSI-RS resource #1. Accordingly, the quality of the L1-SINR reported by the UE may be lowered compared to that in operation method 5-1. Accordingly, a decrease in throughput may be expected as a result. Alternatively, when the UE uses the UE Rx beam (found through CSI-RS resource #0) only in receiving CSI-RS resource #1, the quality of L1-SINR may be improved. However, the UE Rx beam is different from the UE Rx beam through which the UE has received the CSI-IM (which does not match the principle that the QCL-D of CSI-IM conforms to an NZP CSI-RS resource having a linkage), and accordingly a mismatch may occur between the calculated L1-SINR and the actual L1-SINR.

3.6. Sixth Operation Method

The first to fifth operation methods described above may be effectively applied only when the UE reports to the BS that the number of UE Rx beams that the UE is capable of simultaneously defining (or operate) according to the UE capability is 1.

Thus, only when the UE reports to the BS that the number of UE Rx beams that the UE is capable of simultaneously defining (or operate) according to the UE capability is 1, the UE may expect that the first to fifth operation methods described above are applied.

More specifically, when there are two or more UE Rx beams that the UE may use at the same time, two NZP CSI-RS resources having different QCL-Ds may share one CSI-IM. This configuration is different from the assumptions made in the first to fifth operation methods described above.

The UE may report to the BS whether (i) the number of UE Rx beams that the UE may configure simultaneously and/or (ii) whether a plurality of UE Rx beams is configurable, as UE capability. In this case, the BS may recognize whether the UE has configured a plurality of UE Rx beams based on the UE capability. Accordingly, when the BS recognize that the UE does not configure (or cannot configure) a plurality of UE Rx beams, the BS may determine, based on the above-described operation methods, whether a plurality of CSI-RS resources (e.g., NZP CSI-RS resources for channel measurement) share CSI-IM and/or whether a plurality of CSI-RS resources (e.g., NZP CSI-RS resources for channel measurement) and the CSI-IM are configurable to be subjected to FDM on the same OFDM symbol.

According to the above-described examples, the following effects may be expected.

According to the first and second operation methods, the BS may configure CSI-RS resources (e.g., NZP CSI-RS for channel measurement) having the same QCL-D for the UE such that the resources share one CSI-IM. Accordingly, RS overhead may be reduced.

According to the third operation method, when QCL-D is not defined, the BS may configure CSI-RS resources (e.g., NZP CSI-RS for channel measurement) for the UE such that the resources share one CSI-IM. Accordingly, RS overhead may be reduced.

According to the fourth operation method, the BS may establish a configuration such that CSI-RS resources (e.g., NZP CSI-RS for channel measurement) having the same QCL-D and CSI-IMs are frequency division multiplexed on the same OFDM symbol. Accordingly, the latency of the UE may be reduced.

According to the fifth operation method, in determining whether CSI-IM is shared, whether the QCL-D source detected based on (i) a QCL-D source configured for CSI-RS resources (e.g., NZP CSI-RS for channel measurement) and/or (ii) QCL linkage is the same may be considered. Accordingly, RS overhead may be reduced.

Figure 15:
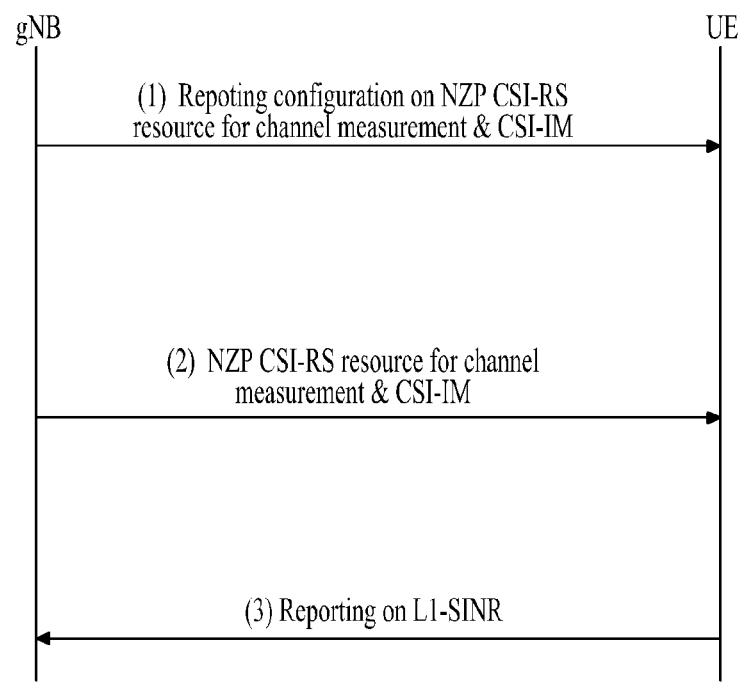
FIG. 15 is a diagram schematically illustrating an example operation of a base station and a terminal applicable to the present disclosure.

FIG. 15 is a diagram schematically illustrating an example operation of a base station and a terminal applicable to the present disclosure.

(1) The BS may transmit NZP CSI-RS configuration (and CSI-IM resource configuration, QCL configuration, etc.) for channel measurement to the UE.

(2) Subsequently, the BS may transmit NZP CSI-RS resources for channel measurement and CSI-IM to the UE. More specifically, the BS may transmit a reference signal (e.g., CSI-RS) to the UE through the NZP CSI-RS resource, and transmit no signal or a specific signal through the CSI-IM resource.

In response, the UE may calculate L1-SINR for each NZP CSI-RS resource on the assumption that the NZP CSI-RS resources having the same QCL-D (or spatial Rx parameter) may be associated with the same CSI-IM resource (or based on a CSI-IM resource determined according to each NZP CSI-RS resource based on. Specifically, the L1-SINR for a specific NZP CSI-RS resource on the aforementioned assumption). Specifically, the L1-SINR for a specific NZP CSI-RS resource may be calculated based on (i) the interference power measured from the corresponding CSI-IM and (ii) the RSRP measured from the specific NZP CSI-RS resource.

(3) The UE may (i) report the calculated L1-SINR for each NZP CSI-RS resource or (ii) transmit the ID of the NZP CSI-RS resource having the best L1-SINR among the calculated L1-SINRs and the L1-SINR associated with the resource to the BS. To this end, the BS may establish a separate configuration such that the UE sends a report according to (i) or (ii).

Figure 16:
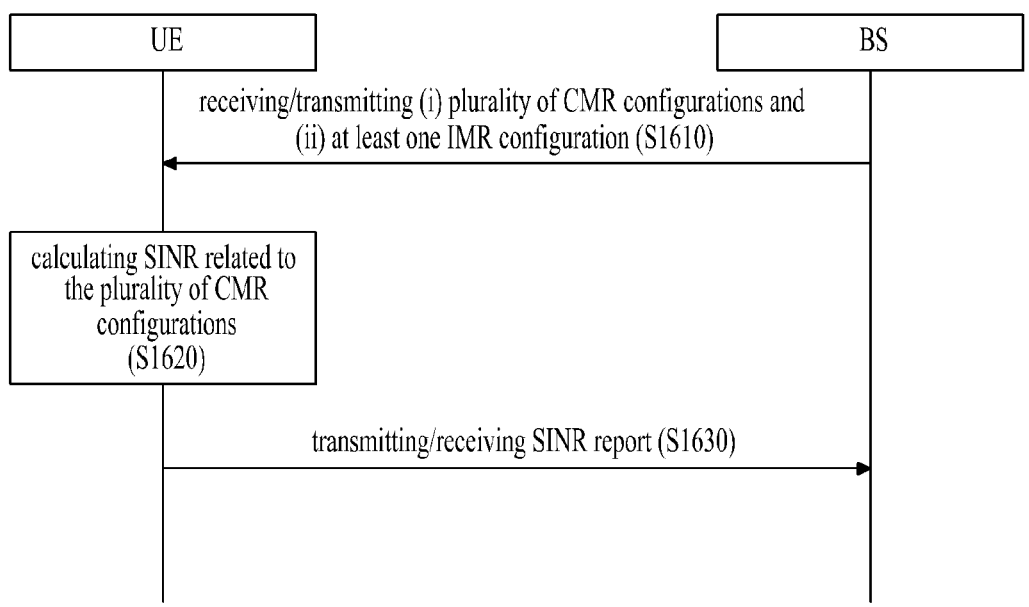
FIG. 16 is a diagram schematically illustrating an example operation of a terminal and a base station according to an example of the present disclosure.
Figure 17:
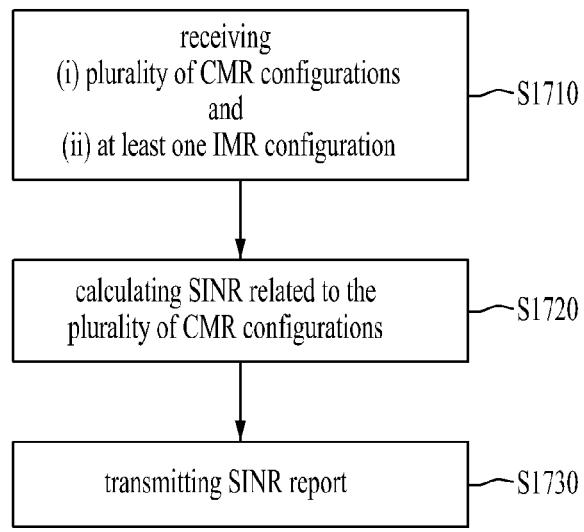
FIG. 17 is a flowchart schematically illustrating an example operation of a terminal according to an example of the present disclosure.
Figure 18:
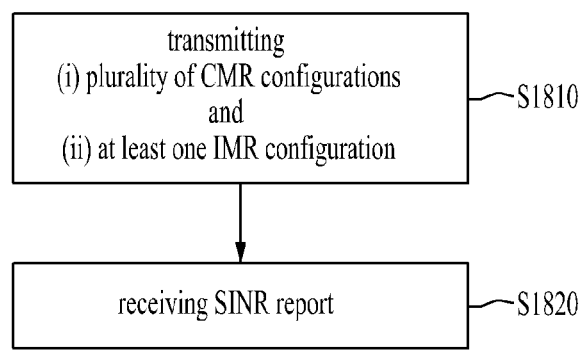
FIG. 18 is a flowchart schematically illustrating an example operation of a base station according to an example of the present disclosure.

FIG. 16 is a diagram schematically illustrating an example operation of a terminal and a base station according to an example of the present disclosure, FIG. 17 is a flowchart schematically illustrating an example operation of a terminal according to an example of the present disclosure, and FIG. 18 is a flowchart schematically illustrating an example operation of a base station according to an example of the present disclosure.

In an example applicable to the present disclosure, the UE may receive configuration information for reporting of a signal to interference noise ratio (SINR) from the BS (S1610 and S1710). Here, the configuration information for reporting of the SINR may include (i) a plurality of channel measurement resource (CMR) configurations and (ii) one or more interference measurement resource (IMR) configurations.

In this regard, the BS may transmit configuration information for reporting of the SINR to the UE (S1610 and S1810). As an example, the BS may transmit the configuration information for reporting of the SINR to the UE based on (i) physical layer signaling (e.g., DCI), (ii) higher layer signaling (e.g., RRC, MAC-CE, etc.), or (iii) a combination of the physical layer signaling and the higher layer signaling.

In the present disclosure, one CMR configuration may include a non-zero power channel state information reference signal (NZP CSI-RS) resource or a synchronization signal/physical broadcast channel (SS/PBCH) block resource. In addition, one IMR configuration may include a channel state information interference measurement (CSI-IM) resource or a non-zero power channel state information-reference signal; NZP CSI-RS) resource.

The UE may calculate the SINR based on the configuration information for reporting of the SINR (S1620, S1720). More specifically, the UE may calculate SINR related to the plurality of CMR configurations on the assumption that two or more CMR configurations having the same Quasi Co Located (QCL) source in terms of a related spatial parameter among the plurality of CMR configurations share the same IMR configuration.

As an example, based on at least two CMR configurations having the same QCL source among the plurality of CMR configurations in terms of a related spatial parameter, the number of the one or more IMR configurations may be configured to be smaller than the number of the plurality of CMR configurations (refer to the first operation method described above).

As another example, the number of the one or more IMR configurations may be set equal to the number of the plurality of CMR configurations. In this case, the plurality of CMR configurations and the one or more IMR configurations may be related by resource-wise.

In the present disclosure, the QCL source in terms of the related spatial parameter may be determined based on a spatial reception parameter (spatial Rx parameter).

In the present disclosure, the QCL source in terms of the related spatial parameter may include (i) channel state information-reference signal (CSI-RS) resource information, (ii) synchronization signal/physical broadcast channel (SS/PBCH) block information, or (iii) tracking reference signal (TRS) information.

In the present disclosure, the QCL source in terms of the related spatial parameter may include one or more of the following sources (refer to the fifth operation method described above).
  (i) a first QCL source configured for one CMR configuration
  (ii) a second QCL source having a QCL linkage with the first QCL source configured for the one CMR configuration In the present disclosure, SINR related to one CMR configuration among the plurality of CMR configurations may be calculated based on: (i) a reference signal received power (RSRP) measured based on the one CMR configuration; and (ii) interference power measured based on the IMR configuration related to the one CMR configuration.

In addition, in the present disclosure, based on a determination that (i) one CMR configuration among the plurality of CMR configurations and (ii) one IMR configuration among the one or more IMR configurations are configured to overlap on a time resource, the UE may assume that the one CMR configuration and the one IMR configuration have a QCL source in terms of the same spatial parameter.

Based on the SINR calculated through the above process, the UE may report an SINR related to the plurality of CMR configurations to the BS (S1630 and S1730). In response, the BS may receive a report on the SINR from the UE (S1630, S1820).

In the present disclosure, the SINR may include an L1-SINR defined as physical layer information.

In the present disclosure, the UE may correspond to at least one of (i) a first UE reporting UE capability information indicating that the number of simultaneously definable reception beams is 1 to the BS, or (ii) a second UE having the number of simultaneously definable reception beams set to 1 by the BS.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

4. Example of Communication Systems to which the Present Disclosure Applies

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
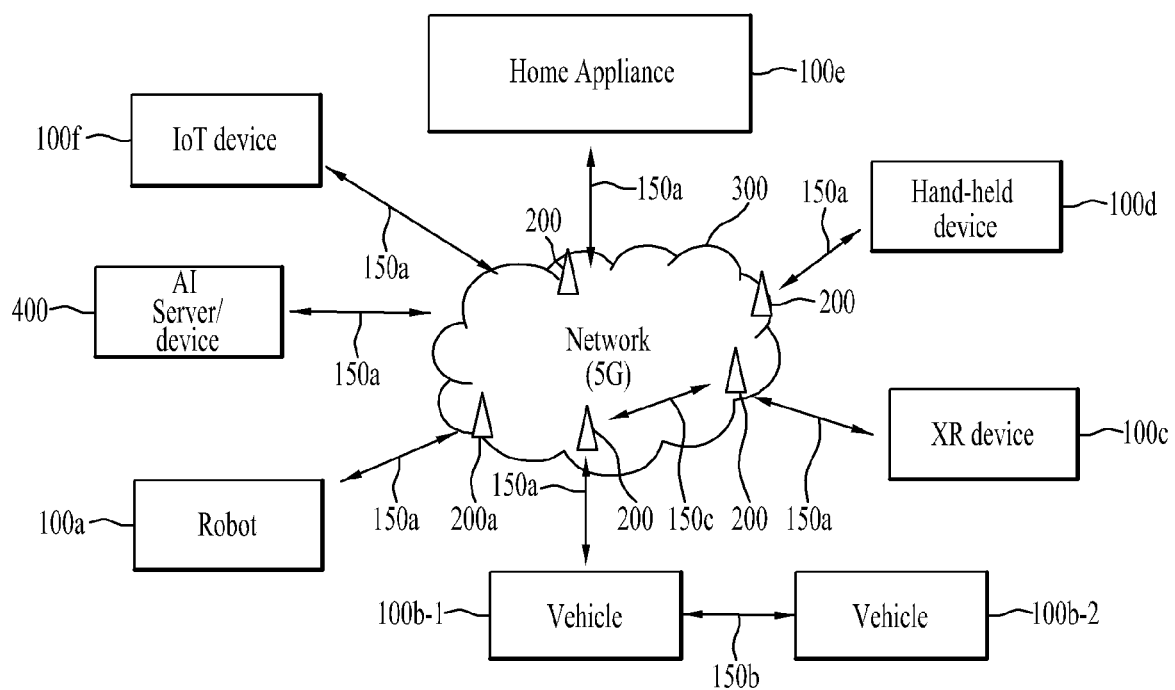
FIG. 19 illustrates a communication system applied to the present disclosure.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

5. Example of Wireless Devices to which the Present Disclosure Applies

Figure 20:
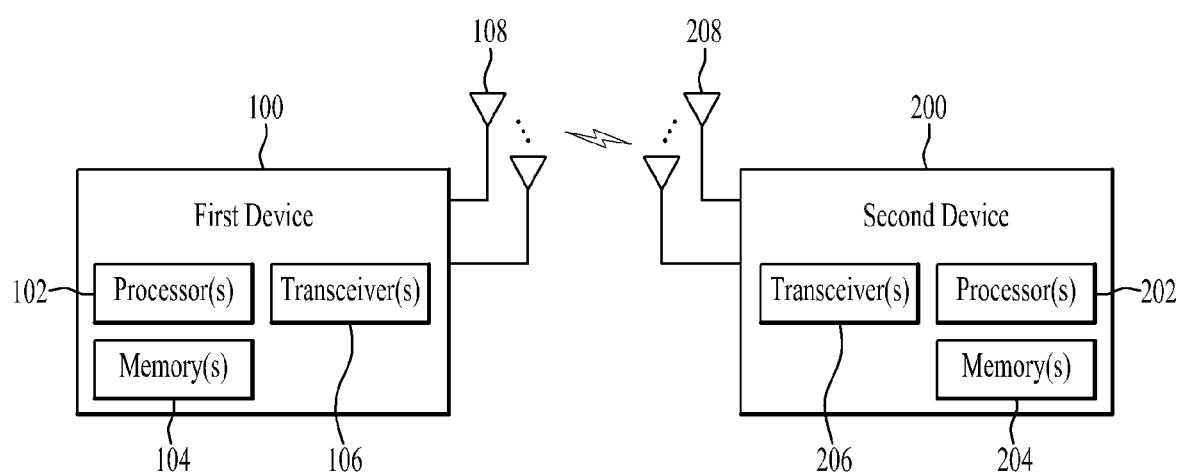
FIG. 20 illustrates a wireless device applicable to the present disclosure.

FIG. 20 illustrates wireless devices applicable to the present disclosure.

Referring to FIG. 20, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

6. Usage Example of Wireless Devices to which the Present Disclosure Applies

Figure 21:
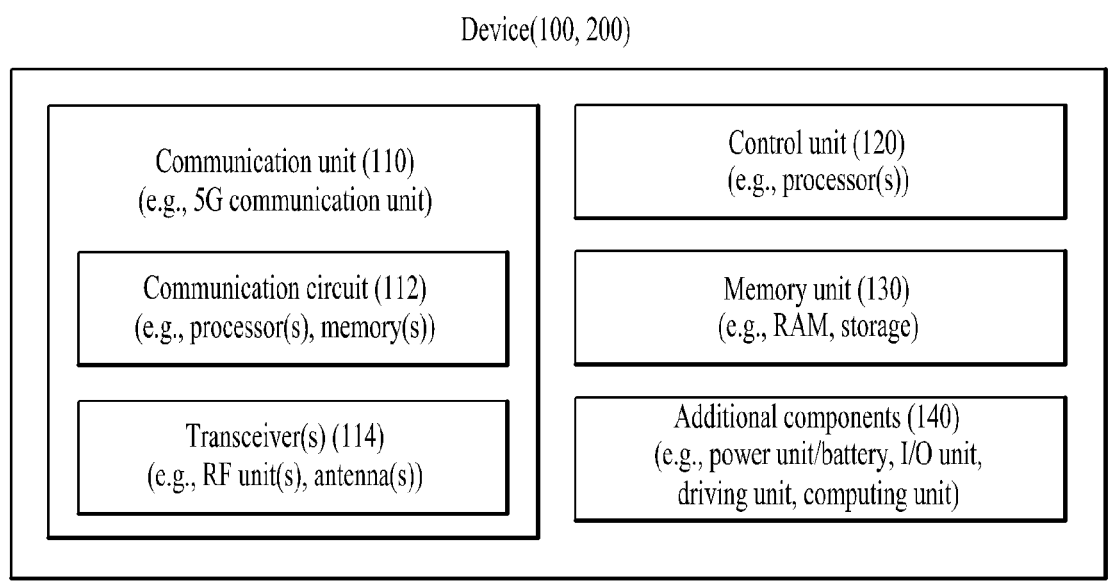
FIG. 21 illustrates another example of a wireless device applied to the present disclosure.

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, an example of implementing FIG. 21 will be described in detail with reference to the drawings.

6.1. Example of Mobile Devices to which the Present Disclosure Applies

Figure 22:
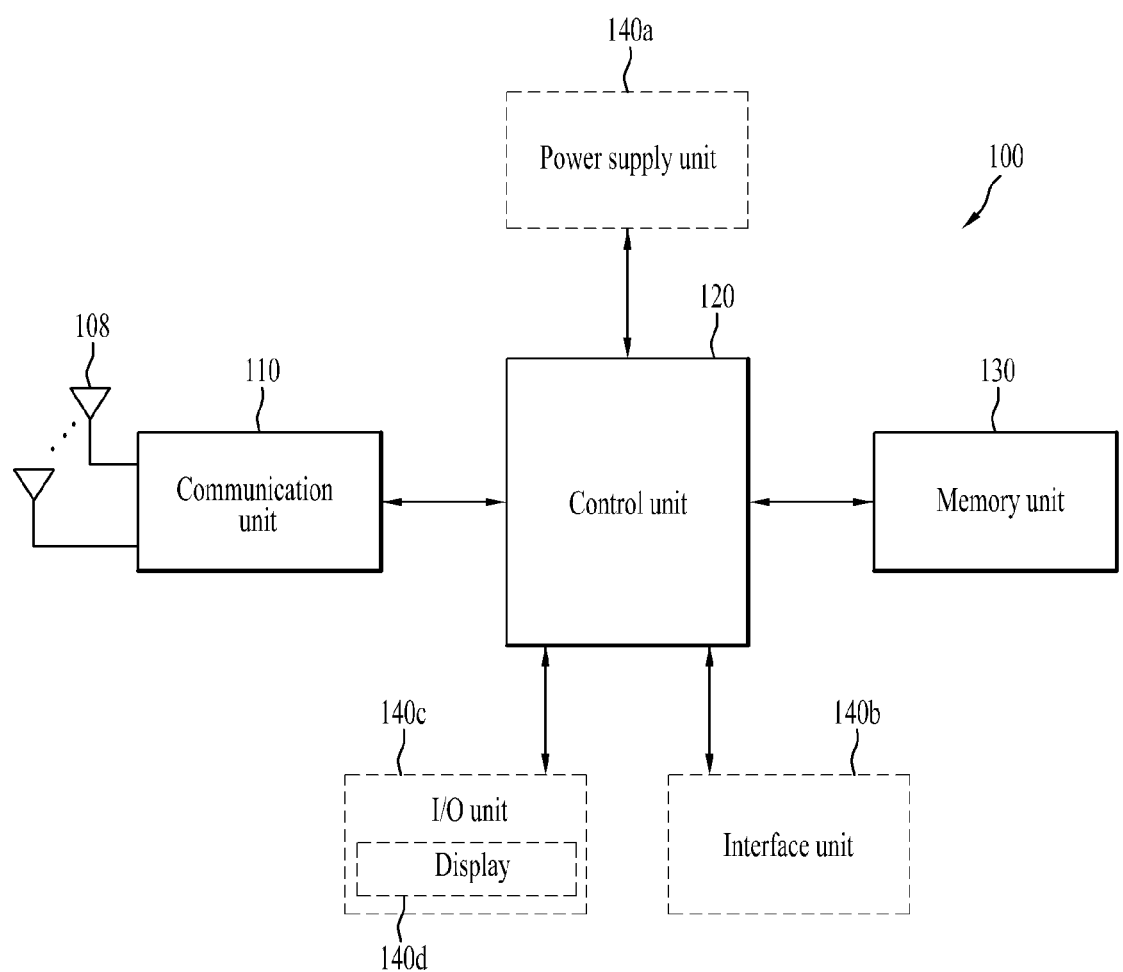
FIG. 22 illustrates a portable device applied to the present disclosure.

FIG. 22 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
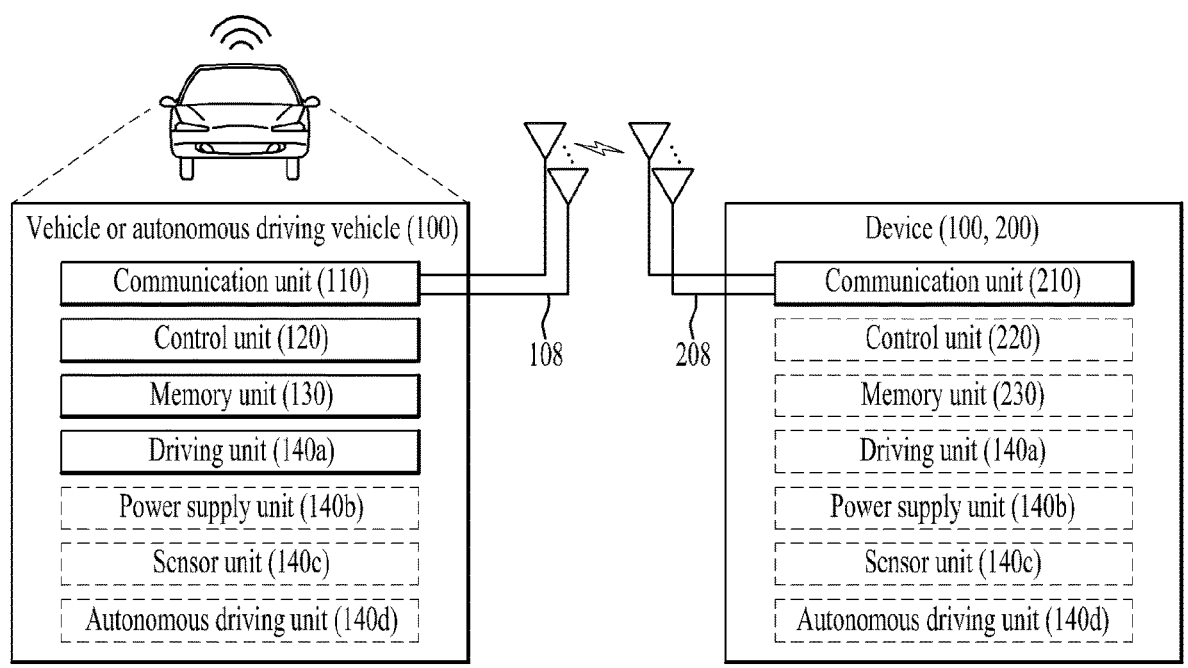
FIG. 23 illustrates a vehicle or an autonomous vehicle applied to the present disclosure.

6.2. Examples of Vehicles or Autonomous Vehicles to which the Present Disclosure Applies FIG. 23 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

It will be appreciated by those skilled in the art that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is apparent to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems. Examples of the wireless access systems include a 3rd Generation Partnership Project (3GPP) system or a 3GPP2 system. Besides these wireless access systems, the embodiments of the present disclosure are applicable to all technical fields in which the wireless access systems find their applications. Moreover, the proposed method is also applicable to mmWave communication systems using an ultra-high frequency band.

Additionally, the embodiments of the present disclosure are applicable to various applications such as a self-driving vehicle and a drone.

The invention claimed is:

1. A method for operating a user equipment (UE) in a wireless communication system, the method comprising:
    receiving, from a base station, a plurality of channel measurement resource (CMR) configurations for reporting of a signal to interference noise ratio (SINR) and one or more interference measurement resource (IMR) configurations;
    based on two or more CMR configurations, among the plurality of CMR configurations, having the same Quasi Co Located (QCL) source for a related spatial parameter, calculating an SINR related to the plurality of CMR configurations,
    wherein one IMR configuration of the one or more IMR configurations is shared on the two or more CMR configurations; and
    reporting, to the base station, the SINR related to the plurality of CMR configurations to the base station.

2. The method of claim 1, wherein the plurality of CMR configurations and the one or more IMR configurations are received through higher layer signaling.

3. The method of claim 1,
    wherein each CMR configuration, among the plurality of CMR configurations, includes a non-zero power channel state information-reference signal (NZP CSI-RS) resource, or a synchronization signal/physical broadcast channel (SS/PBCH) block resource,
    wherein each IMR configuration of the one or more IMR configurations includes a channel state information-interference measurement (CSI-IM) resource or a non-zero power channel state information-reference signal (NZP CSI-RS) resource.

4. The method of claim 1, wherein, based on the two CMR configurations having the same QCL source for the related spatial parameter, a number of the one or more IMR configurations is configured to be smaller than a number of the plurality of CMR configurations.

5. The method of claim 1, wherein the plurality of CMR configurations and the one or more IMR configurations are related by resource-wise.

6. The method of claim 1, wherein the QCL source for the related spatial parameter is determined based on a spatial reception parameter (spatial Rx parameter).

7. The method of claim 1, wherein the QCL source for the related spatial parameter includes channel state information-reference signal (CSI-RS) resource information, synchronization signal/physical broadcast channel (SS/PBCH) block information, or tracking reference signal (TRS) information.

8. The method of claim 1, wherein the same QCL source for the related spatial parameter includes at least one of:
    (i) a first QCL source configured for one CMR configuration of the two or more CMR configurations; or
    (ii) a second QCL source having a QCL linkage with the first QCL source configured for the one CMR configuration.

9. The method of claim 1, wherein, for each CMR configuration among the plurality of CMR configurations, an SINR is calculated based on:
    (i) a reference signal received power (RSRP) measured based on a respective CMR configuration; and
    (ii) an interference power measured based on an IMR configuration related to the respective CMR configuration.

10. The method of claim 1, wherein, based on a determination that (i) one CMR configuration among the plurality of CMR configurations and (ii) one IMR configuration among the one or more IMR configurations are configured to overlap on a time resource, the UE assumes that the one CMR configuration and the one IMR configuration have the QCL source for the same spatial parameter.

11. The method of claim 1, wherein the SINR includes an L1-SINR defined as physical layer information.

12. The method of claim 1, wherein the UE is at least one of:
    (i) a first UE that reports to the base station UE capability information indicating that a number of simultaneously definable reception beams is 1; or
    (ii) a second UE having a number of simultaneously definable reception beams configured to be 1 by the base station.

13. A terminal operating in a wireless communication system, the terminal comprising:
    at least one transmitter;
    at least one receiver;
    at least one processor; and
    at least one memory operably connected to the at least one processor and configured to store instructions causing, when executed, the at least one processor to perform a specific operation, wherein the specific operation comprises:

receiving, from a base station, a plurality of channel measurement resource (CMR) configurations for reporting of a signal to interference noise ratio (SINR) and one or more interference measurement resource (IMR) configurations;

based on two or more CMR configurations, among the plurality of CMR configurations, having a same Quasi Co Located (QCL) source for a related spatial parameter, calculating an SINR related to the plurality of CMR configurations, wherein one IMR configuration of the one or more IMR configurations is shared on the two or more CMR configurations; and reporting, to the base station, the SINR related to the plurality of CMR configurations.

14. The terminal of claim 13, wherein the terminal communicates with at least one of a mobile terminal, a network, or an autonomous vehicle other than a vehicle containing the terminal.

15. A base station operating in a wireless communication system, the base station comprising:
- at least one transmitter;
- at least one receiver;
- at least one processor; and
- at least one memory operably connected to the at least one processor and configured to store instructions causing, when executed, the at least one processor to perform a specific operation, wherein the specific operation comprises:

transmitting, to the terminal, a plurality of channel measurement resource (CMR) configurations for reporting of a signal to interference noise ratio (SINR) and one or more interference measurement resource (IMR) configurations; and receiving, from the terminal, an SINR related to the plurality of CMR configurations, wherein two or more CMR configurations, among the plurality of CMR configurations, have a same Quasi Co Located (QCL) source for a related spatial parameter, and wherein one IMR configuration of the one or more IMR configurations is shared on the two or more CMR configurations.

* * * * *